United States Patent
Gwak

(10) Patent No.: US 11,366,524 B2
(45) Date of Patent: Jun. 21, 2022

(54) SYSTEM FOR MODIFYING AND PROVIDING TACTILE STIMULATION

(71) Applicant: BHAPTICS INC., Daejeon (KR)

(72) Inventor: Ki Uk Gwak, Daejeon (KR)

(73) Assignee: BHAPTICS INC., Daejeon (KR)

( * ) Notice: Subject to any disclaimer, the term of this patent is extended or adjusted under 35 U.S.C. 154(b) by 283 days.

(21) Appl. No.: 16/086,262

(22) PCT Filed: Nov. 14, 2016

(86) PCT No.: PCT/KR2016/013106
§ 371 (c)(1),
(2) Date: Sep. 18, 2018

(87) PCT Pub. No.: WO2017/164480
PCT Pub. Date: Sep. 28, 2017

(65) Prior Publication Data
US 2020/0293111 A1      Sep. 17, 2020

(30) Foreign Application Priority Data

Mar. 25, 2016   (KR) .................. 10-2016-0035886

(51) Int. Cl.
*G06F 3/01* (2006.01)
(52) U.S. Cl.
CPC .................... *G06F 3/016* (2013.01)
(58) Field of Classification Search
CPC ........................................................ G06F 3/01
USPC ....................................................... 345/156
See application file for complete search history.

(56) References Cited

U.S. PATENT DOCUMENTS

| 9,202,353 | B1 | 12/2015 | Sisbot et al. | |
| 2005/0132290 | A1* | 6/2005 | Buchner | G06F 3/011 715/702 |
| 2011/0248837 | A1 | 10/2011 | Israr et al. | |
| 2013/0218456 | A1 | 8/2013 | Zelek et al. | |
| 2014/0089792 | A1* | 3/2014 | Ramsay | G06F 3/016 715/702 |
| 2014/0330094 | A1 | 11/2014 | Pacione et al. | |
| 2015/0022328 | A1 | 1/2015 | Choudhury | |
| 2015/0123774 | A1 | 5/2015 | Ioffreda et al. | |

(Continued)

FOREIGN PATENT DOCUMENTS

| CN | 1200860 A | 12/1998 |
| CN | 101583992 A | 11/2009 |

(Continued)

OTHER PUBLICATIONS

Story of bHaptics—YouTube Video published on Oct. 13, 2015 (https://www.youtube.com/watch?v=JEqMEnKPcGA.).

(Continued)

*Primary Examiner* — Long D Pham
(74) *Attorney, Agent, or Firm* — IP & T Group LLP

(57) ABSTRACT

A tactile stimulation providing system includes: a tactile stimulation pattern generating apparatus for generating a tactile stimulation pattern through a user interface including a plurality of virtual actuators to which positions of a plurality of actuators are mapped; and a tactile stimulation providing apparatus including the plurality of actuators, the tactile stimulation providing apparatus driving the plurality of actuators according to the generated tactile stimulation pattern.

4 Claims, 23 Drawing Sheets

(56) References Cited

U.S. PATENT DOCUMENTS

2019/0204919 A1    7/2019  Gwak et al.
2019/0286236 A1    9/2019  Gwak et al.

FOREIGN PATENT DOCUMENTS

| JP | 2013-121369 A | 6/2013 |
|----|---------------|--------|
| KR | 10-0252706 B1 | 4/2000 |
| KR | 10-2011-0009462 A | 1/2011 |
| KR | 10-1559288 B1 | 10/2015 |
| WO | WO 2010/085007 | 7/2010 |
| WO | 2018/230790 | 12/2018 |
| WO | 2018/230949 | 12/2018 |
| WO | 2018/230951 | 12/2018 |

OTHER PUBLICATIONS

Office Action issued by Korean Intellectual Property Office dated Dec. 31, 2019.
Jonatan Martinez et al., "Vitaki: A Vibrotactile Prototyping Toolkit for Virtual Reality and Video Games," International Journal of Human-Computer Interaction, vol. 30, No. 11, Sep. 30, 2014, pp. 855-871.
Dong Haiwei et al., "Development of a Web-based Haptic Authoring Tool for Multimedia Applications," 2015 IEEE International Symposium on Multimedia (ISM), Dec. 14, 2015, pp. 13-20.
Markus Jonas, "A Prototyping Tool to Design and Test Vibrotactile Patterns," RWTH Aachen University, May 30, 2008.
Extended Search Report issued by the EPO dated Jan. 17, 2020.
Office Action issued by the CNIPA dated Jun. 1, 2021.

\* cited by examiner

83

83

SYSTEM FOR MODIFYING AND PROVIDING TACTILE STIMULATION

TECHNICAL FIELD

The present invention relates a tactile stimulation providing system.

BACKGROUND ART

A tactile stimulation providing apparatus includes a plurality of actuators, and selectively vibrates the plurality of actuators, thereby providing a tactile stimulation to a user.

Prior Document 1 (U.S. Patent Publication No. 2015-0123774, May 5, 2015) discloses a tactile stimulation providing apparatus in the form of a chair. In Prior Document 1, the tactile stimulation providing apparatus generates an active pattern by detecting a sound, and applies the active pattern to a plurality of vibrating motors, thereby providing a tactile stimulation to a user. The vibrating motor corresponds to an actuator.

Referring to FIG. 1 of Prior Document 1, the tactile stimulation providing apparatus includes six vibrating motors. Referring to FIG. 6 of Prior Document 1, there is illustrated a sectional view showing a vicinity of each vibrating motor. Also, the tactile stimulation providing apparatus additionally includes six voice coil motors that are devices for transferring vibrations to a user like the vibrating motors. Referring to FIGS. 7 and 8 of Prior Document 1, there is illustrated a sectional view showing a vicinity of each voice coil motor.

Referring to FIG. 6 of Prior Document 1, the bottom of the vibrating motor is adhered to a hard foam, the side of the vibrating motor is fixed to a soft foam while being surrounded by the soft foam, and the top of the vibrating motor is covered with a pad front cover.

Since the foams around the vibrating motor absorb a vibration, this structure is applicable only when the size and strength of the vibrating motor is large. When the vibrating motors are arranged at a sufficient distance, the user can distinguish vibrations of the individual vibrating motors from one another. On the other hand, when the vibrating motors are densely arranged, the user has difficulty in distinguishing vibrations of the individual vibrating motors from one another due to a slightly large size and strong vibration of the vibrating motor. Therefore, it is difficult to provide a tactile stimulation having high resolution.

Referring to FIGS. 7 and 8 of Prior Document 1, the voice coil motors having a size and a vibration strength, which are slightly smaller than those of the vibrating motors, are not directly fixed to the hard foam but fixed to an acryl plate, to be surrounded by the hard foam and the soft foam.

Since a vibration is less absorbed than a case where the voice coil motor is in direct contact with the foam, this structure is applicable to a motor having a relatively small vibration strength, and thus motors can be more densely arranged. However, as a vibration of an individual motor is transferred to a place at which other motors around the individual motor exist through the acryl plate, it is difficult to distinguish vibrations of the individual motors from one another. Therefore, it is still difficult to provide a tactile stimulation having high resolution.

In addition, the local transfer of a vibration has a deep correlation with the degree of close contact between the tactile stimulation providing apparatus and a body of a user. However, Prior Document 1 is problematic in that a solution for allowing the tactile stimulation providing apparatus to be in close contact with the body of the user is not proposed.

DISCLOSURE

Technical Problem

The present invention is conceived to solve the aforementioned problems. Accordingly, an object of the present invention is to provide a tactile stimulation providing system including not only a tactile stimulation providing apparatus having a structure in which the tactile stimulation providing apparatus is effectively adhered closely to a body of a user but also a tactile stimulation generating apparatus capable of easily generating a tactile stimulation pattern through a user interface.

Technical Solution

According to an aspect of the present invention, there is provided a tactile stimulation providing apparatus including: a tactile stimulation pattern generating apparatus configured to generate a tactile stimulation pattern through a user interface including a plurality of virtual actuators to which positions of a plurality of actuators are mapped; and a tactile stimulation providing apparatus including the plurality of actuators, the tactile stimulation providing apparatus driving the plurality of actuators according to the generated tactile stimulation pattern.

The tactile stimulation pattern generating apparatus may generate the tactile stimulation pattern by setting a driving value to a plurality of virtual actuators corresponding to a path on the user interface.

The tactile stimulation pattern generating apparatus may generate the tactile stimulation pattern by setting a driving value to at least one virtual actuator selected on the user interface.

The tactile stimulation providing apparatus may further include: a base band; a plurality of caps accommodating the plurality of actuators to be located on one surface of the base band, the plurality of caps being exposed to the outside; and a plurality of bases fixing the plurality of caps at the other surface of the base band.

According to another aspect of the present invention, there is provided a tactile stimulation providing apparatus including: a plurality of actuators; a base band having the plurality of actuators located thereon, the base band including a first detachable member at an upper surface of one end thereof; an auxiliary band including a second detachable member attachable/detachable to/from the first detachable member at a lower surface of one end thereof; and a controller case including a first opening into which the auxiliary band is inserted.

The tactile stimulation providing apparatus may further include a ring located at the other end of the base band. The base band may further include a third detachable member located between the first detachable member and an edge of the one end, the third detachable member being attachable/detachable to/from the first detachable member.

The auxiliary band may further include a fourth detachable member attachable/detachable to/from the third detachable member at an upper surface of the one end.

The shape of the ring may correspond to that of the one end of the base band.

The tactile stimulation providing apparatus may further include: a plurality of caps accommodating the plurality of actuators to be located on a lower surface of the base band, the plurality of caps being exposed to the outside; and a plurality of bases fixing the plurality of caps to the base band at the opposite side of the plurality of caps.

The tactile stimulation providing apparatus may further include: a controller located in the controller case, the controller generating a driving signal corresponding to the plurality of actuators; and a signal transmission member configured to transmit the driving signal from the controller to the plurality of actuators. The base band may further include a second opening into which the signal transmission member is inserted, the auxiliary band may further include a third opening into which the signal transmission member is inserted, and the control case may further include a fourth opening into which the signal transmission member is inserted.

According to still another aspect of the present invention, there is provided computer-readable recording medium for recording a program executable by a computer, wherein the program generates a user interface, and the user interface includes: an arrangement area including a plurality of virtual actuators with respect to a tactile stimulation frame; a content area including a reference content having time-series information; and a timeline area in which the tactile stimulation frame is arranged corresponding to the time-series information.

The timeline area may include a plurality of tracks corresponding to a plurality of tactile stimulation providing apparatuses. The tactile stimulation frame may be subordinate to any one track among the plurality of tracks.

The timeline area may include a plurality of tracks corresponding to a plurality of directions. The tactile stimulation frame may be subordinate to any one track among the plurality of tracks.

The user interface may further include a direction indicator. Any one direction among the plurality of directions may be selected based on a state of the direction indicator, and a track corresponding to the selected direction may be displayed in the timeline area.

According to still another aspect of the present invention, there is provided a tactile stimulation providing apparatus including: a wearing part; a plurality of actuators located at the wearing part; and a controller configured to control driving of the plurality of actuators according to a multidirectional tactile stimulation pattern including a first direction tactile stimulation pattern and a second direction tactile stimulation pattern, wherein the controller controls the driving of the plurality of actuators according to the first direction tactile stimulation pattern when the tactile stimulation providing apparatus faces a first direction, and controls the driving of the plurality of actuators according to the second direction tactile stimulation pattern when the tactile stimulation providing apparatus faces a second direction.

When the tactile stimulation providing apparatus faces a third direction that does not belong to the multidirectional tactile stimulation pattern and is a direction between the first direction and the second direction, the controller may control the driving of the plurality of actuators by spacing the first direction tactile stimulation pattern apart.

The controller may control the driving of the plurality of actuators by spacing the first direction tactile stimulation pattern apart at a distance in proportion to an angle between the first direction and the third direction.

When the tactile stimulation providing apparatus faces a third direction that does not belong to the multidirectional tactile stimulation pattern, the controller may control the driving of the plurality of actuators by lowering a driving strength of the first direction tactile stimulation pattern.

The controller may control the driving of the plurality of actuators by lowering the driving strength of the first direction tactile stimulation pattern with a magnitude in proportion to an angle between the first direction and the third direction.

When the tactile stimulation providing apparatus faces a third direction that does not belong to the multidirectional tactile stimulation pattern, the controller may control the driving of the plurality of actuators by rotating the first direction tactile stimulation pattern.

Advantageous Effects

The tactile stimulation providing system according to the present invention may include not only a tactile stimulation providing apparatus having a structure in which the tactile stimulation providing apparatus is effectively adhered closely to a body of a user but also a tactile stimulation generating apparatus capable of easily generating a tactile stimulation pattern through a user interface.

MODE FOR THE INVENTION

Figure 1:
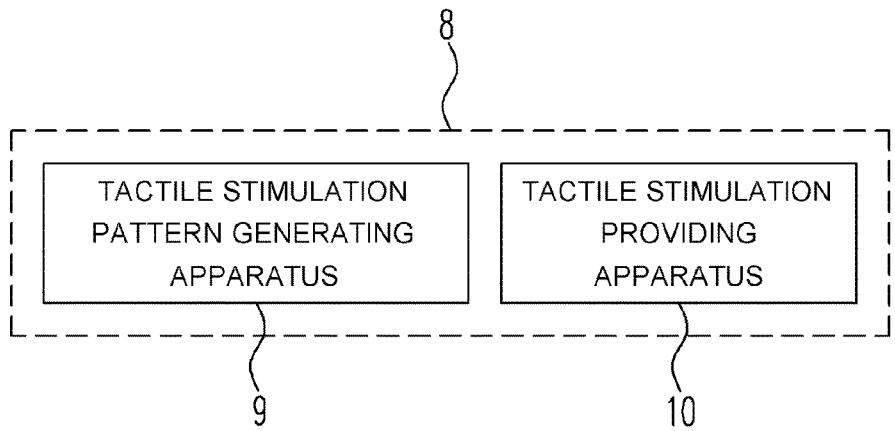
FIG. 1 is a view illustrating a tactile stimulation providing system according to an embodiment of the present invention.

Hereinafter, exemplary embodiments are described in detail with reference to the accompanying drawings so that those skilled in the art may easily practice the present invention. The present invention may be implemented in various different forms and is not limited to the exemplary embodiments described in the present specification.

A part irrelevant to the description will be omitted to clearly describe the present invention, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present invention is not limited thereto. Thicknesses of several portions and regions are exaggerated for clear expressions.

FIG. 1 is a view illustrating a tactile stimulation providing system according to an embodiment of the present invention.

Referring to FIG. 1, the tactile stimulation providing system 8 according to the embodiment of the present invention includes a tactile stimulation pattern generating apparatus 9 and a tactile stimulation providing apparatus 10.

The tactile stimulation pattern generating apparatus 9 generates a tactile stimulation pattern through a user interface including a plurality of virtual actuators to which the positions of a plurality of actuators are mapped.

The tactile stimulation pattern generating apparatus 9 may be a computer including at least one processor and at least one memory to process information. The tactile stimulation pattern generating apparatus 9 may perform a desired function by reading a computer-readable recording medium in which data or programs are recorded.

The computer-readable recording medium includes all kinds of recording media in which data or programs can be read by a computer system. Examples of the computer-readable recording medium include a ROM, a RAM, a CD-ROM, a magnetic tape, a floppy disk, an optical data storage device, a hard disk, an external hard disk, an SSD, a USB storage device, a DVD, a Blu-ray disk, and the like. Also, the computer readable recording medium may be a combination of a plurality of devices, and be distributed to computer systems connected through a network. The recording medium may be a non-transitory computer-readable recording medium. The non-transitory computer-readable recording medium refers to a medium which stores data or programs semi-permanently and can be read by a computer, rather than a medium that stores data or programs temporarily such as a register, cache or memory.

The user interface may be implemented with a display device for displaying visual information to a user and an input device for receiving an input of the user. The display device may include a monitor, a TV, a projector, a mobile display, and the like. The input device may include a mouse, a keyboard, a touch pad, a microphone, a vision sensor, and the like. The display device and the input device are not necessarily separated from each other. For example, the display device and an input device may be integrally implemented as, for example, a touch display device.

The plurality of actuators refer to a plurality of tactile stimulation providing modules that physically exist in the tactile stimulation providing apparatus 10. Each of the plurality of actuators may be a vibration motor that is one of electric actuators. Hereinafter, a case where each of the plurality of actuators is the vibration motor is described as an example, but each of the plurality of actuators may be a pneumatic or hydraulic actuator. Therefore, one kind or a plurality kinds of actuators may be applied to the present invention.

The user interface includes a plurality of virtual actuators to which the positions of a plurality of actuators are mapped. The user interface may be graphically displayed such that the user can intuitively recognize a physical arrangement of the plurality of actuators included in the tactile stimulation providing apparatus. In an example, when the tactile stimulation providing apparatus 10 includes a plurality of actuators of five rows and five columns, the user interface may include a plurality of virtual actuators of five rows and five columns. In another example, when the tactile stimulation providing apparatus 10 includes a plurality of actuators of one row and five columns, the user interface may include a plurality of virtual actuators of one row and five columns.

In another embodiment, the plurality of actuators of the tactile stimulation providing apparatus 10 and the plurality of virtual actuators of the user interface may not correspond one-to-one to each other. For example, a tactile stimulation pattern generated with respect to a plurality of virtual actuators of one row and five columns in the tactile stimulation pattern generating apparatus 9 may correspond to one row among the plurality of actuators of five rows and five columns in the tactile stimulation providing apparatus 10. Therefore, a method for matching a plurality of actuators and a plurality of virtual actuators may be varied in some embodiments.

The tactile stimulation pattern generated in the tactile stimulation pattern generating apparatus 9 may be a program or data provided as an input of the tactile stimulation providing apparatus 10.

The tactile stimulation providing apparatus 10 includes a plurality of actuators, and drives a plurality of actuators according to the generated tactile pattern. As the driving time, driving frequency, driving strength, and driving distance of the plurality of actuators are adjusted according to the tactile stimulation pattern, the user of the tactile stimulation providing apparatus 10 may feel various tactile stimulations.

The tactile stimulation providing apparatus 10 may include a base band, a plurality of actuators, a plurality of caps, and a plurality of bases. The cap and base constitute an actuator case, to perform a function of fixing a corresponding actuator to the base band.

The plurality of caps may allow the plurality of actuators to be located on one surface of the base band while accommodating the plurality of actuators, and be exposed to the outside. The plurality of bases may fix the plurality of caps at the other surface of the base band.

The plurality of caps may be exposed to the outside to be in contact with a body of the user, and the user may feel various tactile stimulations due to vibrations of the plurality of caps.

The tactile stimulation providing apparatus 10 will be described in detail later with reference to drawings from FIG. 20.

Figure 2:
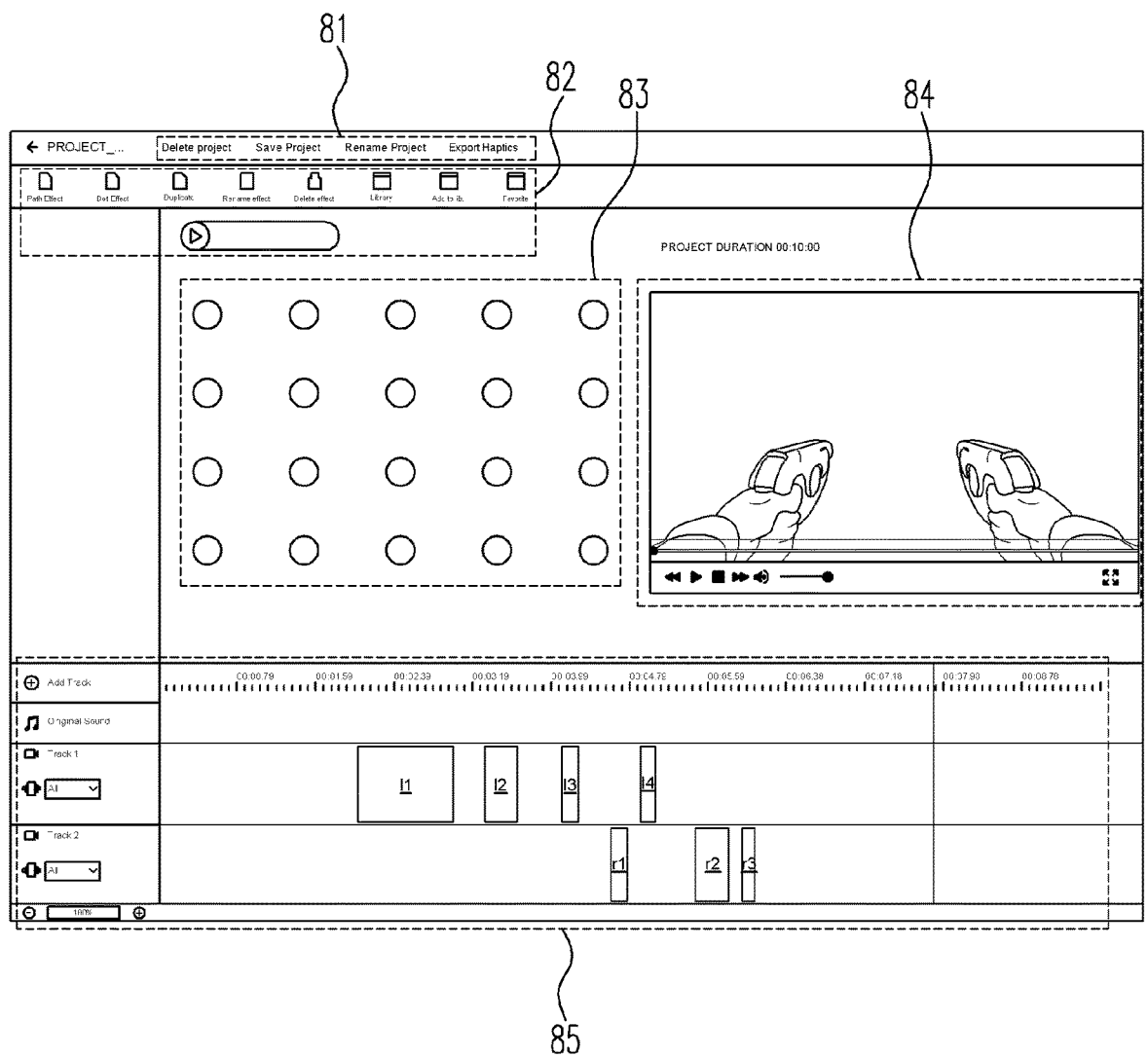
FIG. 2 is a view illustrating a user interface according to an embodiment of the present invention.

FIG. 2 is a view illustrating a user interface according to an embodiment of the present invention.

The user interface 80a may be generated by a program, and the program may be performed using a computer. The program may be recorded in a computer-readable recording medium.

Referring to FIG. 2, the user interface 80a may include a project management area 81, an effect management area 82, an arrangement area 83, a reference content area 84, and a timeline area 85.

The project management area 81 may include a plurality of menus for project management. For example, the project management area 81 may include menus of Delete Project, Save Project, Rename Project, and Export Haptics. An extracted tactile stimulation pattern may be used in the tactile stimulation providing apparatus 10.

The effect management area 82 may include menus of Path Effect, Dot Effect, Duplicate, Rename Effect, and Delete Effect.

The arrangement area 83 may include a plurality of virtual actuators. Although a plurality of virtual actuators of four rows and five columns are illustrated in FIG. 2, the number and arrangement of virtual actuators may be changed through manipulation of menus. In an embodiment, a user may change the shape of arrangement by dragging and dropping each of the virtual actuators. Unlike the quadrangular arrangement of FIG. 2, a circular arrangement or an arrangement having another shape may be implemented.

The reference content area 84 may include reference contents. The reference contents may be image data, sound data, image and sound complex data, and the like. The reference contents may have time-series information. Time-series information of a tactile stimulation pattern generated through a project may correspond to that of the reference contents.

The timeline area 85 displays a plurality of tactile stimulation frames I1, I2, I3, I4, r1, r2, and r3 arranged based on the time-series information of the reference contents. The size of each of the tactile stimulation frames may be in proportion to a time for which an effect of the corresponding tactile stimulation frame is provided.

The timeline area 85 may have at least one track. In some embodiments, the timeline area 85 may have a plurality of tracks. The plurality of tracks may correspond to a plurality of tactile stimulation providing apparatuses, respectively. For example, when it is expected that the user will wear one tactile stimulation providing apparatus 10 around a left arm thereof and wear another tactile stimulation providing apparatus 10 around a right arm thereof, the timeline area 85 may be configured to two tracks. A first track Track 1 may correspond to the tactile stimulation providing apparatus worn around the left arm of the user. A second track Track 2 may correspond to the tactile stimulation providing apparatus worn around the right arm of the user.

Each of the tactile stimulation frames may be subordinate to a specific track. For example, the tactile stimulation frames I1, I2, I3, and I4 may be subordinate to the first track Track 1, and the tactile stimulation frames r1, r2, and r3 may be subordinate to the second track Track 2.

Figure 3:
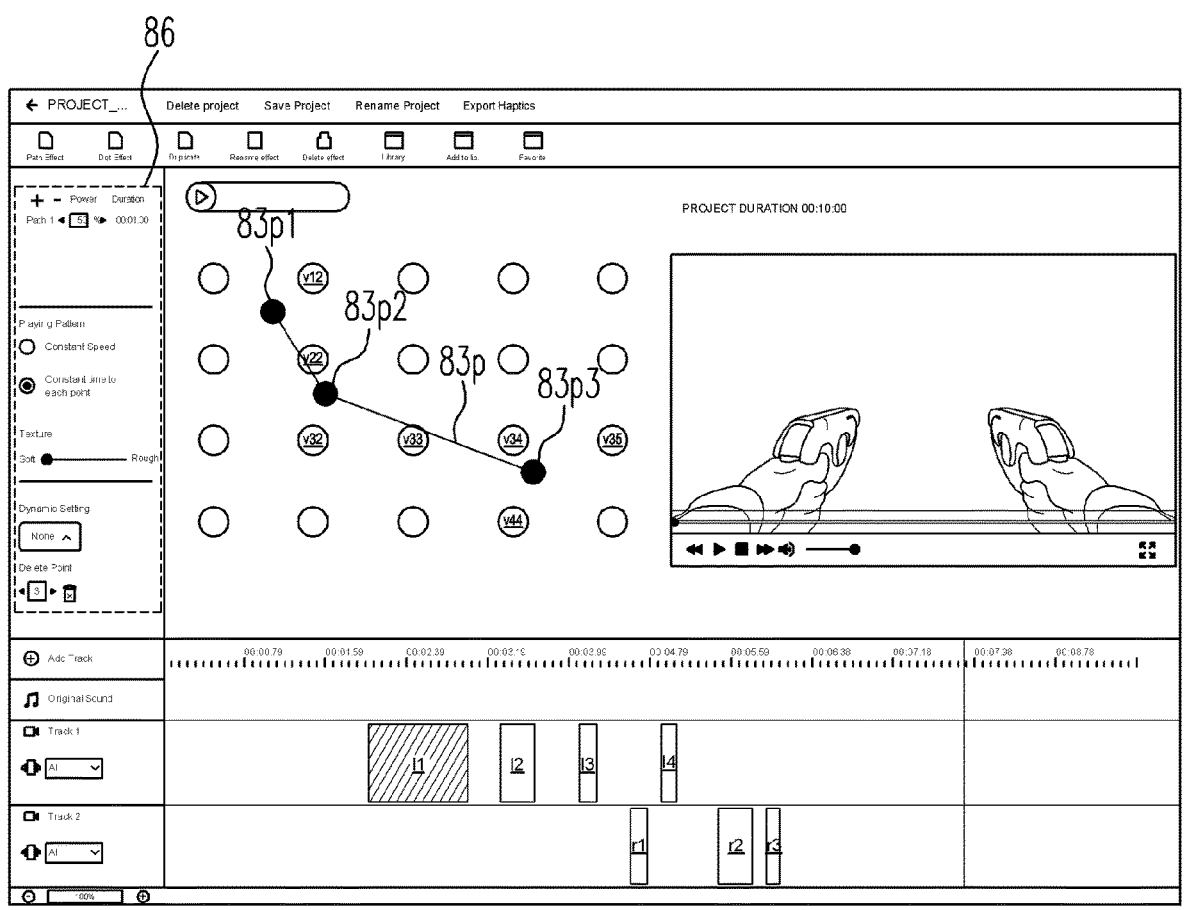
FIG. 3 is a view illustrating a path effect that is a unit effect.

FIG. 3 is a view illustrating a tactile stimulation pattern having a path effect that is a unit effect.

Referring to FIG. 3, the user interface 80a further includes a path effect setting area 86. The path effect setting area 86 may be displayed when the user selects the menu of Path Effect in the effect management area 82. When the menu of Path Effect is selected, the tactile stimulation frame I1 may be generated to correspond to the menu of Path Effect.

The user may select the menu of Path Effect in the effect management area 82 and draw a path 83p in the arrangement area 83. In an embodiment, the user may draw the path 83p by sequentially clicking a point 83p1, a point 83p2, and a point 83p3, using a mouse that is an input device. In another embodiment, the user may draw the path 83p at a time by dragging, using the mouse that is the input device. In another embodiment, when the input device is a touch pad, the user may draw the path 38p, using a finger. A path effect Path 1 may be generated in the path effect setting area 86, corresponding to the drawn path 83p. The path effect Path 1 is a unit effect, and an application effect may be generated by combining one or a plurality of path effects or by combining dot effects which will be described later.

The tactile stimulation pattern generating apparatus 9 may generate a tactile stimulation pattern by setting a driving value to a plurality of virtual actuators corresponding to the path 83p on the user interface 80a. The driving value may include elements such as a driving strength, a driving frequency, a driving time, and a driving distance.

In an embodiment, a tactile stimulation pattern may be generated by setting a driving value to a virtual actuator closest to a point corresponding to each time of the path 83p. For example, a tactile stimulation pattern having the path effect Path 1 may be generated by sequentially setting driving values to virtual actuators v12, v22, v32, v33, and v34.

In another embodiment, a tactile stimulation pattern may be generated by setting driving values to virtual actuators constituting a triangle surrounding a point corresponding to each time of the path 83*p*. For example, driving values may be simultaneously set to virtual actuators v34, v35, and v44 so as to provide a tactile stimulation to the point 83*p*3. The driving values of the virtual actuators constituting a triangle may be different from one another. A relatively large driving value may be set to the virtual actuator v34 close to the point 83*p*3, and relatively small driving values may be set to the virtual actuators v35 and v44 relatively distant from the point 83*p*3.

Although FIG. 3 illustrates that the tactile stimulation frame I1 has one path effect Path 1, the user may insert an additional path effect into the tactile stimulation frame I1 by pressing a path effect addition button (e.g., a plus button) in the path effect setting area 86. Also, the user may delete a previously generated path effect from the tactile stimulation frame I1 by pressing a path effect deletion button (e.g., a minus button). When the tactile stimulation frame I1 has a plurality of path effects, the start time and end time of each path effect may be independently set. For example, the start time and end time of a first path effect may be set as 0.0 to 0.2 second, the start time and end time of a second path effect may be set as 0.4 to 0.7 second, and the start time and end time of a third path effect may be set as 0.6 to 1.0 second.

The user may adjust driving strengths of a plurality of virtual actuators of which driving values are set by adjusting power values in the path effect setting area 86. The sizes of graphic symbols displayed at the points 83*p*1, 83*p*2, and 83*p*3 may be changed depending on power values. For example, when the power value increases, the size of the graphic symbol may increases. When the power value decreases, the size of the graphic symbol may decreases. Thus, the user can intuitively recognize the magnitude of vibration power corresponding to the size of a graphic symbol of each of the point 83*p*1, 83*p*2, and 83*p*3.

The user may adjust the time length of the path effect Path 1 by adjusting a duration value in the path effect setting area 86. Also, the user may adjust the time length of the path effect Path 1 by dragging a side of the tactile stimulation frame I1 corresponding to the timeline area 85.

The user may adjust a playing pattern in the path effect setting area 86. In an embodiment, when a constant speed is selected as the playing pattern, driving values of a plurality of virtual actuators may be set such that a tactile stimulation is applied at the constant speed from the start point 83*p*1 and the end point 83*p*3. In another embodiment, when a constant time of each point is selected as the playing pattern, driving values of a plurality of virtual actuators may be set such that a tactile stimulation is applied at a slow speed from the point 83*p*1 to the point 83*p*2 and then applied at a fast speed from the point 83*p*2 to the point 83*p*3.

The user may adjust a texture of the path effect Path 1 in the path effect setting area 86. When the texture is almost soft, the connectivity between a plurality of actuators is improved, and therefore, smooth driving may be performed. When the texture is almost rough, the connectivity between a plurality of actuators is deteriorated, and therefore, intermittent driving may be performed.

The user may adjust a dynamic setting value in the path effect setting area 86. The dynamic setting value may include fade-in, fade-out, no setting, and the like.

Figure 4:
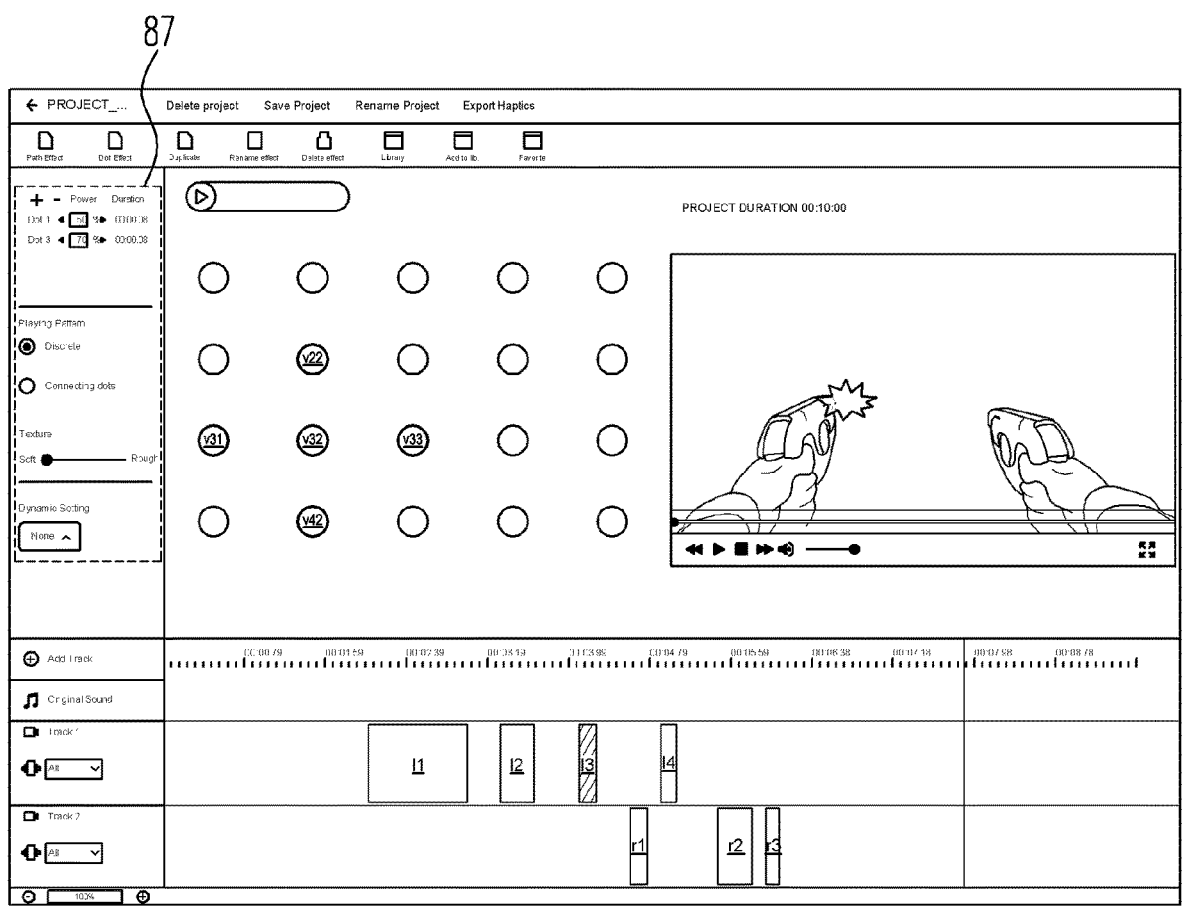
FIG. 4 is a view illustrating a dot effect that is a unit effect.

FIG. 4 is a view illustrating a dot effect that is a unit effect.

Referring to FIG. 4, the user interface 80*a* may further include a dot effect setting area 87. The dot effect setting area 87 may be displayed when the user selects the menu of Dot Effect in the effect management area 82. When the menu of Dot Effect is selected, the tactile stimulation frame I3 may be generated in the timeline area 85.

The user may select the menu of Dot Effect and select at least one virtual actuator v22, v31, v32, v33, and v42 in the arrangement area 83. In an embodiment, the user may click each of the actuators v22, v31, v32, v33, and v42, using a mouse that is an input device. A dot effect Dot 1 or Dot 2 may be generated in the dot effect setting area 87, corresponding to an input of the user. The dot effect Dot 1 or Dot 2 is a unit effect, and an application effect may be generated by combining one or a plurality of dot effects or by combining the dot effect with the above-described path effect.

FIG. 4 illustrates that the tactile stimulation frame I3 has two dot effects Dot 1 and Dot 2. The user may insert an additional dot effect into the tactile stimulation frame I3 by pressing a dot effect addition button (e.g., a plus button) in the dot effect setting area 87. The user may delete the previously generated dot effect Dot 1 or Dot 2 from the tactile stimulation frame I3 by pressing a dot effect deletion button (e.g., a minus button). When the tactile stimulation frame I3 has a plurality of dot effects, the start time and end time of each dot effect may be independently set. For example, the start time and end time of a first dot effect may be set as 0.0 to 0.2 second, the start time and end time of a second dot effect may be set as 0.4 to 0.7 second, and the start time and end time of a third dot effect may be set as 0.6 to 1.0 second.

The user may adjust driving strengths of a plurality of virtual actuators v22, v31, v32, v33, and v42 of which driving values are set by adjusting power values in the dot effect setting area 87. The sizes of graphic symbols displayed at the virtual actuators v22, v31, v32, v33, and v42 may be changed depending on power values. For example, when the power value increases, the size of the graphic symbol may increases. When the power value decreases, the size of the graphic symbol may decreases. Thus, the user can intuitively recognize the magnitude of vibration power corresponding to the size of a graphic symbol of each of the virtual actuators v22, v31, v32, v33, and v42.

The user may adjust the time length of the dot effect Dot 1 or Dot 2 by adjusting a duration value in the dot effect setting area 87. Also, the user may adjust the time length of the dot effect by dragging a side of the tactile stimulation frame I3 corresponding to the timeline area 85.

The user may adjust a playing pattern in the dot effect setting area 87. When the playing pattern has discrete dots, the first dot effect Dot 1 and the second dot effect Dot 2 may have driving values separated without connectivity between virtual actuators. When the playing pattern has connecting dots, the first dot effect Dot 1 and the second dot effect Dot 2 may have driving values where virtual actuators are temporarily connected while having a temporal connectivity as if the first dot effect Dot 1 and the second dot effect Dot 2 are one effect.

The user may adjust a texture in the dot effect setting area 87. The texture may be meaningful when the playing pattern has connecting dots, and the connectivity between the first dot effect Dot 1 and the second dot effect Dot 2 may become soft or become slightly rough. When the texture is set rough, a tactile stimulation having a feeling close to when the play pattern has discrete dots may be provided even when the playing pattern has connecting dots.

Application effects that can be generated using the path effect and the dot effect, which are the above-described unit effects, will be described with reference to FIGS. 5 to 12. These application effects may be generated in advance to be provided in a library form.

Figure 5:
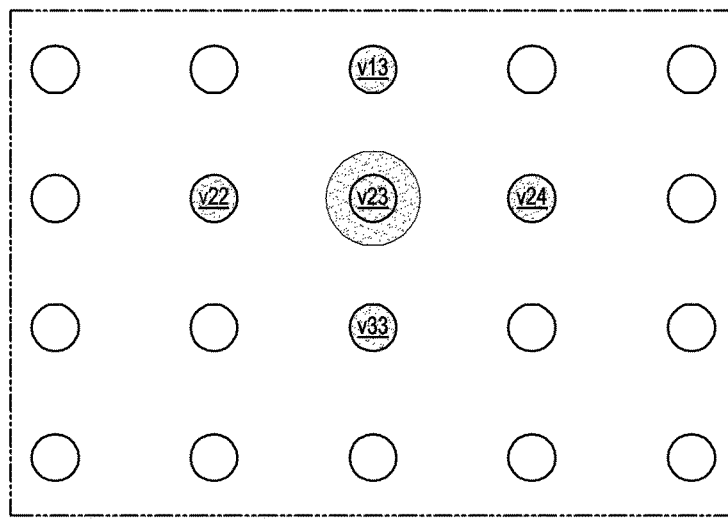
FIG. 5 is a view illustrating a tactile stimulation pattern having a one-time effect that is an application effect.

FIG. 5 is a view illustrating a tactile stimulation pattern having a one-time effect that is an application effect.

Referring to FIG. 5, a one-time effect may be expressed when a certain number of virtual actuators v13, v22, v23, v24, and v33 simultaneously have a driving value for a short time. The one-time effect may be suitable for, for example, a gunshot of an action movie, a blow, a tramp, a bumping effect of an object, etc.

Any dynamic setting value such as fade-in or fade-out may not be provided in the one-time effect.

Figure 6:
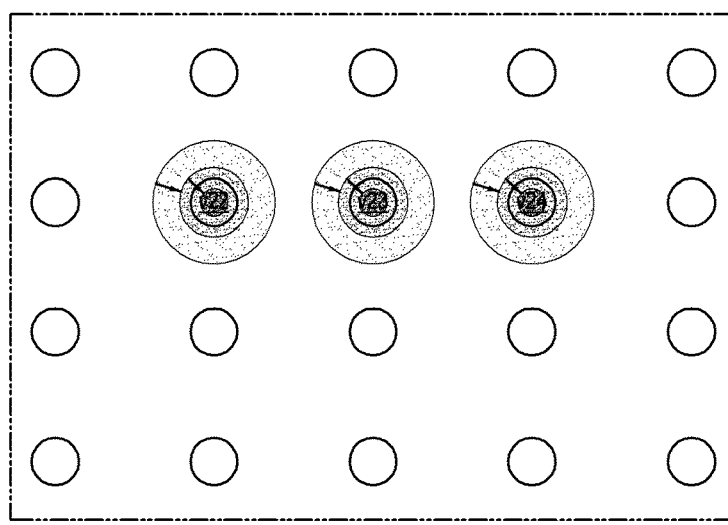
FIG. 6 is a view illustrating a tactile stimulation pattern having a fade-out effect that is an application effect.

FIG. 6 is a view illustrating a tactile stimulation pattern having a fade-out effect that is an application effect.

Referring to FIG. 6, a fade-out effect may be expressed when the driving strength of a certain number of virtual actuators v22, v23, and v24 decreases as time goes on. The fade-out effect may be suitable for a far spreading gunshot, a sound effect of a shell, etc. Also, the fade-out effect may be suitable for a background sound in a low voice range, such as a sound of bass guitar or a sound of gong.

Figure 7:
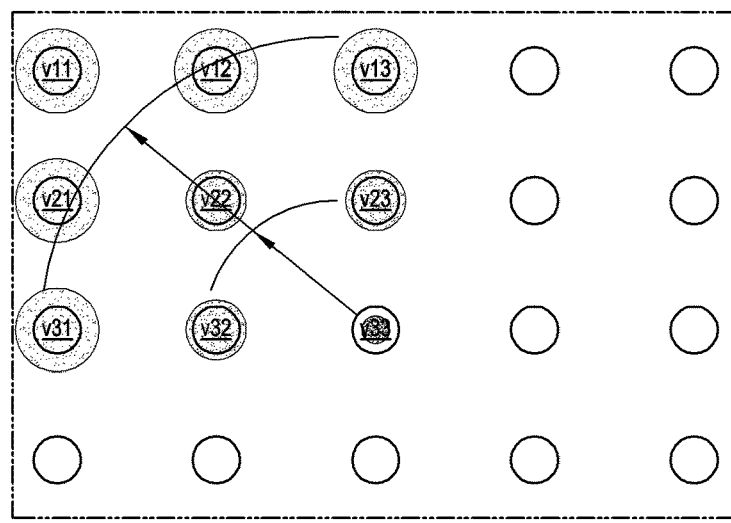
FIG. 7 is a view illustrating a tactile stimulation pattern having an external propagation effect that is an application effect.

FIG. 7 is a view illustrating a tactile stimulation pattern having an external propagation effect that is an application effect.

Referring to FIG. 7, an external propagation effect may be expressed when a plurality of virtual actuators v11, v12, v13, v21, v22, v23, v31, v32, and v33 have a driving value corresponding to a time in an external propagation direction.

In an embodiment, in order to express the external propagation effect, a virtual actuator v33 may be first driven, virtual actuators v22, v23, and v32 may be then driven, and virtual actuators v11, v12, v13, v21, and v31 may be finally driven.

In an embodiment, when each of the virtual actuators is driven strongly for a short time, the external propagation effect may be suitable for a spreading sound having a short and high tone, such as an explosion, a large bumping effect or an effect sound of cymbals.

In another embodiment, when each of the virtual actuators is driven gently for a long time, the external propagation effect may be suitable for a kiss, a romantic physical affection, an appearance of a ghost, a hair-raising scene, a surprising scene, etc.

In still another embodiment, the external propagation effect may be suitable for a fade-out scene or a zoom-out scene.

Figure 8:
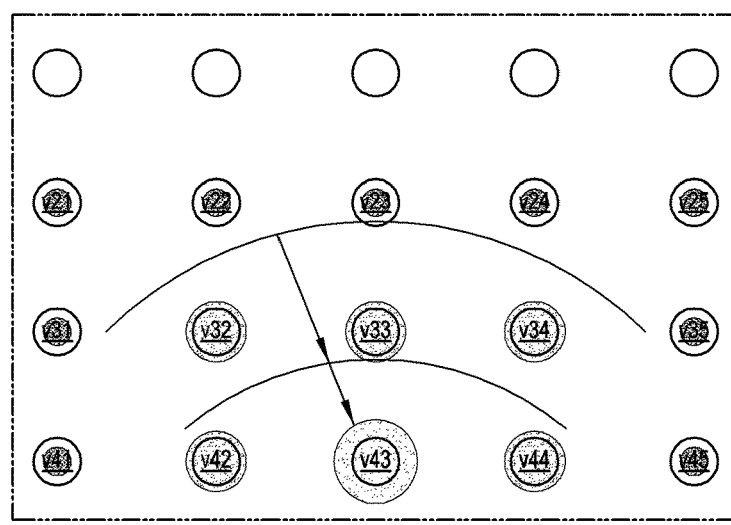
FIG. 8 is a view illustrating a tactile stimulation pattern having an internal propagation effect that is an application effect.

FIG. 8 is a view illustrating a tactile stimulation pattern having an internal propagation effect that is an application effect.

Referring to FIG. 8, an internal propagation effect may be expressed when a plurality of virtual actuators v21, v22, v23, v24, v25, v31, v32, v33, v34, v35, v41, v42, v43, v44, and v45 have a driving value corresponding to a time in an internal propagation direction.

In an embodiment, in order to express the internal propagation effect, virtual actuators v21, v22, v23, v24, v25, v31, v35, v41, and v45 may be first driven, virtual actuators v32, v33, v34, v42, and v44 may be then driven, and a virtual actuator v43 may be finally driven.

In an embodiment, when each of the virtual actuators is driven strongly for a short time, the internal propagation effect may be suitable for an expression of a snatch action, a snitch action, a closure of a door, etc.

In another embodiment, when each of the virtual actuators is driven gently for a long time, the internal propagation effect may be suitable for an expression of a romantic physical affection such as holding of hands.

Figure 9:
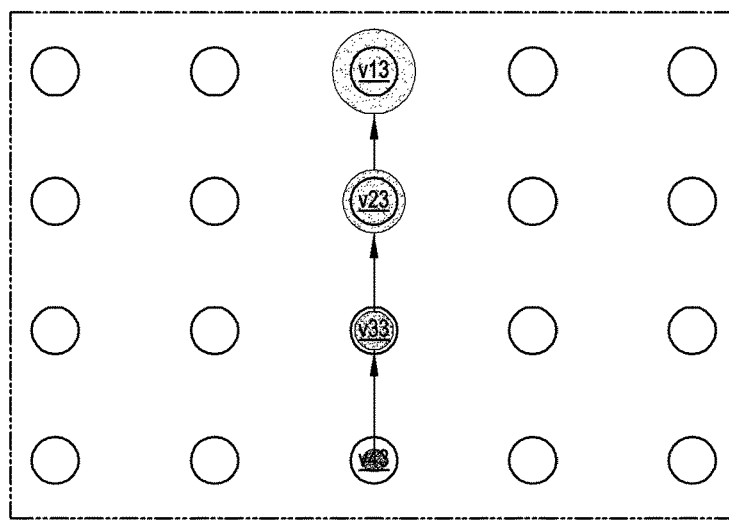
FIG. 9 is a view illustrating a tactile stimulation pattern having an ascending effect that is an application effect.

FIG. 9 is a view illustrating a tactile stimulation pattern having an ascending effect that is an application effect.

Referring to FIG. 9, an ascending effect may be expressed when a plurality of virtual actuators v43, v33, v23, and v13 sequentially have a driving value in an ascending direction.

In an embodiment, the ascending effect may be suitable for an expression of a lifting action, an effect sound or background sound where a pitch increases, etc.

Figure 10:
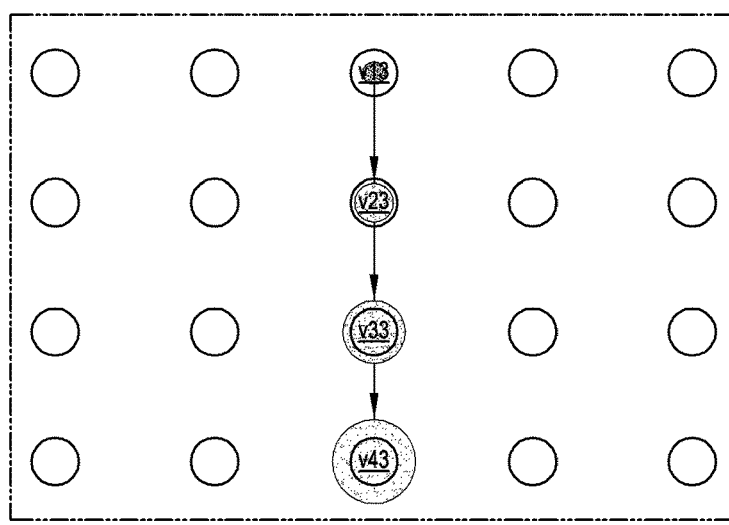
FIG. 10 is a view illustrating a tactile stimulation pattern having a descending effect that is an application effect.

FIG. 10 is a view illustrating a tactile stimulation pattern having a descending effect that is an application effect.

Referring to FIG. 10, a descending effect may be expressed when a plurality of virtual actuators v13, v23, v33, and v43 sequentially have a driving value in a descending direction.

In an embodiment, the descending effect may be suitable for an expression of an action where an object or character descends or falls, an effect sound or background sound where a pitch decreases, etc.

Figure 11:
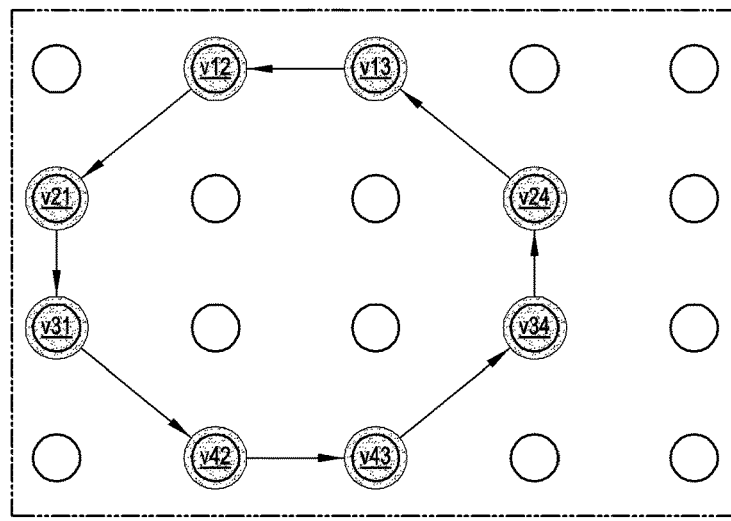
FIG. 11 is a view illustrating a tactile stimulation pattern having a rotation effect that is an application effect.

FIG. 11 is a view illustrating a tactile stimulation pattern having a rotation effect that is an application effect.

Referring to FIG. 11, a rotation effect may be expressed when a plurality of virtual actuators v13, v12, v21, v31, v42, v43, v34, v24, and v13 sequentially have a driving value counterclockwise. In another embodiment, the plurality of virtual actuators may sequentially have a driving value clockwise.

In an embodiment, the rotation effect may be suitable for an expression of a situation in which an object, character, scene or the like rotates, etc. Also, the rotation effect may be suitable for a scene in which a character or the like swings arms.

In FIG. 11, the rotation effect is expressed with only the plurality of virtual actuators v13, v12, v21, v31, v42, v43, v34, v24, and v13, using the dot effect. However, a more gentle rotation effect may be expressed using the path effect of FIG. 3.

Figure 12:
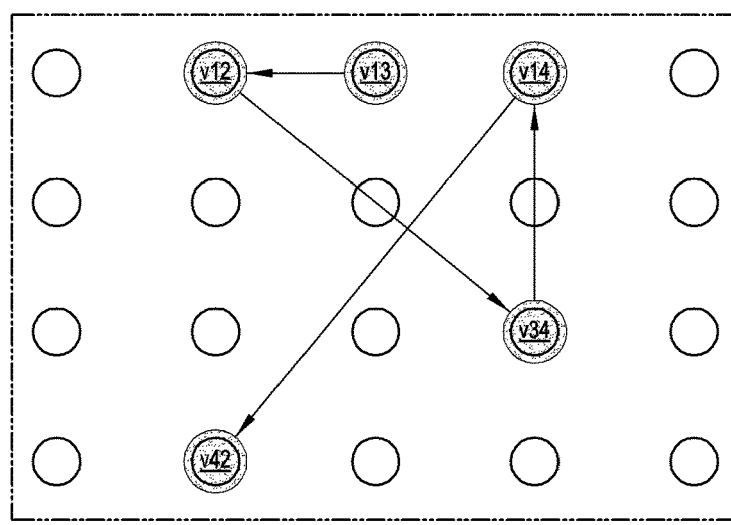
FIG. 12 is a view illustrating a tactile stimulation pattern having an irregular effect that is an application effect.

FIG. 12 is a view illustrating a tactile stimulation pattern having an irregular effect that is an application effect.

Referring to FIG. 12, an irregular effect may be expressed when virtual actuators including a plurality of virtual actuators v13, v12, v34, v14, and v42 have a driving value.

In an embodiment, the irregular effect may be suitable for a situation in which a character feels ticklish, a situation in which a character is strained, a situation in which a character is embarrassed, a situation in which a character gets irritated, a situation in which a character feels pain in a body thereof, a situation in which a character feels electricity, a rainy sound, etc.

Figure 13:
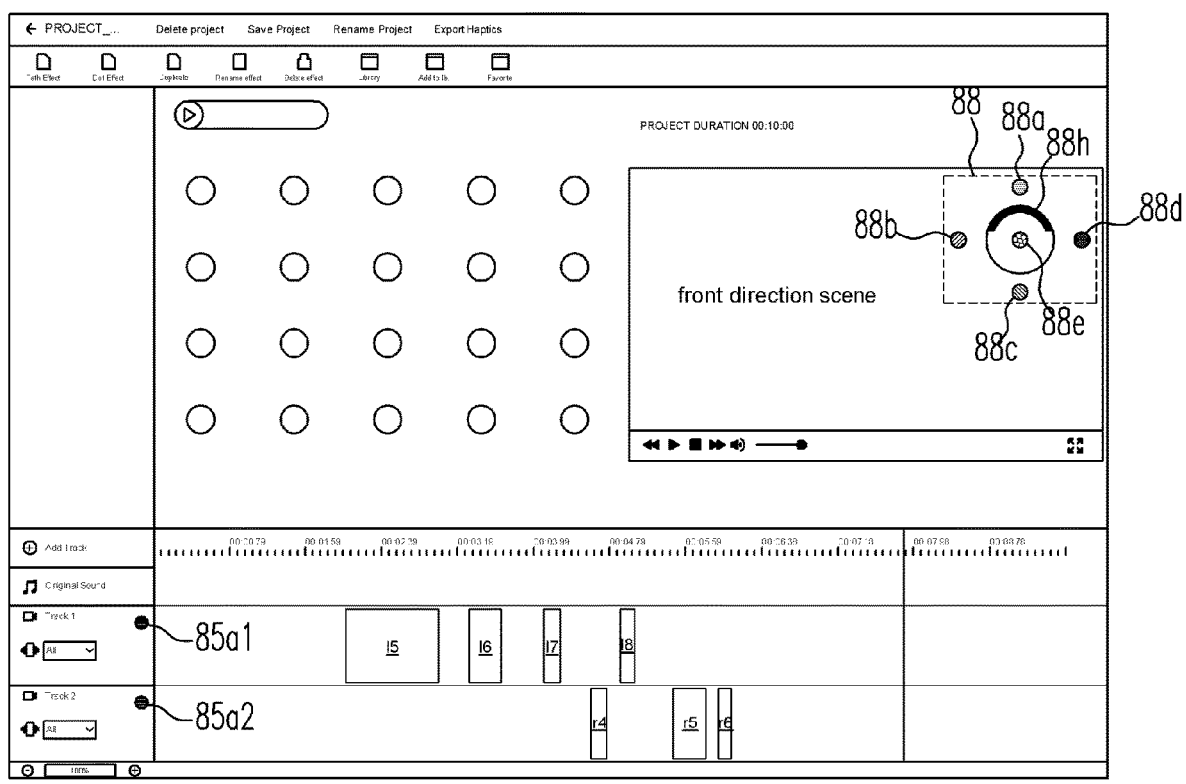
FIG. 13 is a view illustrating a user interface when a direction indicator included therein indicates a front direction according to an embodiment of the present invention.
Figure 14:
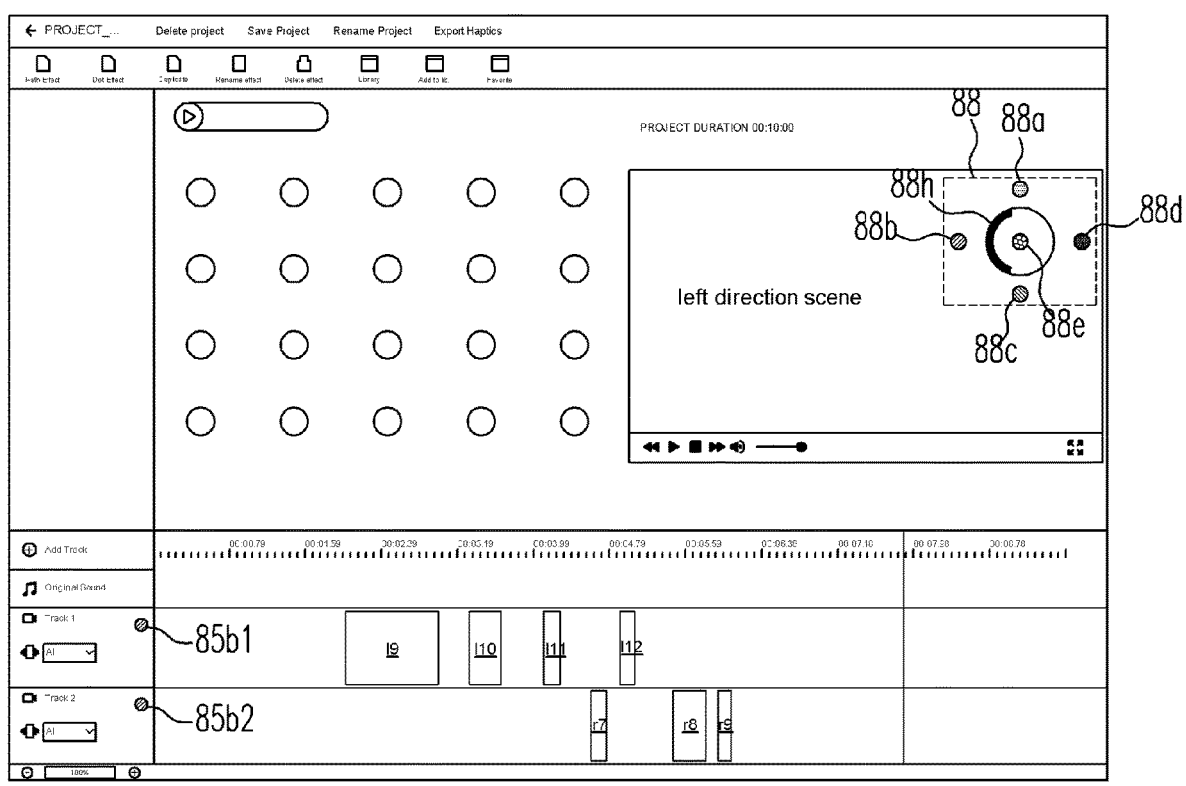
FIG. 14 is a view illustrating the user interface when the direction indicator indicates a left direction.

FIG. 13 is a view illustrating a user interface when a direction indicator included therein indicates a front direction according to an embodiment of the present invention. FIG. 14 is a view illustrating the user interface when the direction indicator indicates a left direction.

The user interface 80b may be used when a reference content includes multidirectional information. For example, when the reference content is a 360-degree image, the reference content may include various information such as front direction information, rear direction information, left direction information, and right direction information. Various tactile stimulation patterns such as a front direction tactile stimulation pattern, a rear direction tactile stimulation pattern, a left direction tactile stimulation pattern, and a right direction tactile stimulation pattern may be generated through the user interface 80*b* of this embodiment.

The user interface 80*b* may be used even when any reference content does not exist in advance. For example, when it is expected that a wearer of the tactile stimulation providing apparatus 10 will enjoy a content using various information, such as a virtual reality game, a multidirectional tactile stimulation pattern to be provided corresponding to received multidirectional information may be generated in advance through the user interface 80*b*.

A timeline area of the user interface 80*b* of FIGS. 13 and 14 may include a plurality of tracks corresponding to a plurality of directions. A tactile stimulation frame may be subordinate to any one track among the plurality of tracks.

For example, referring to FIG. 13, front direction notification lamps 85*a*1 and 85*a*2 are displayed in a first track Track 1 and a second track Track 2. The first track Track 1 may include tactile stimulation frames I5, I6, I7, and I8, and the second track Track 2 may include tactile stimulation frames r4, r5, and r6. Referring to FIG. 14, left direction notification lamps 85*b*1 and 85*b*2 are displayed in the first track Track 1 and the second track Track 2. The first track Track 1 may include tactile stimulation frames I9, I10, I11, and I12, and the second track Track 2 may include tactile stimulation frames r7, r8, and r9. For example, the tactile stimulation frames I5, I6, I7, and I8 may be used as components of a tactile stimulation pattern when the tactile stimulation providing apparatus worn on a left arm of a user faces the front direction. The tactile stimulation frames r4, r5, and r6 may be used as components of a tactile stimulation pattern when the tactile stimulation providing apparatus worn on a right arm of the user faces the front direction. The tactile stimulation frames I9, I10, I11, and I12 may be used as components of a tactile stimulation pattern when the tactile stimulation providing apparatus worn on the left arm of the user faces the left direction. The tactile stimulation frames r7, r8, and r9 may be used as components of a tactile stimulation pattern when the tactile stimulation providing apparatus worn on the right arm of the user faces the left direction.

Referring to FIGS. 13 and 14, the user interface 80*b* according to the embodiment of the present invention may further include a direction indicator 88. The direction indicator 88 may include a highlight part 88*h*. In some embodiments, the direction indicator 88 may further include a front direction display part 88*a*, a left direction display part 88*b*, a rear direction display part 88*c*, a right direction display part 88*d*, and an upper direction display part 88*e*. Although not shown in the drawings, the user interface 80*b* may be configured such that one of the upper direction display part 88*e* and a lower direction display part is selectively displayed according to whether an option has been checked. Hereinafter, a case where the upper direction display part 88*e* is displayed will be described as an example.

Any one direction among the plurality of directions is selected based on a state of the direction indicator 88, and a track corresponding to the selected direction may be displayed in the timeline area.

For example, the user may perform an editing operation on a track and a tactile stimulation frame with respect to a desired direction by clicking a portion of the direction indicator 88. In FIG. 13, the user may perform an editing operation on a track and tactile stimulation frames I5, I6, I7, I8, r4, r5, and r6 with respect to the front direction by clicking an upper portion of the direction indicator 88. In FIG. 14, the user may perform an editing operation on a track and tactile stimulation frames I9, I10, I11, I12, r7, r8, and r9 with respect to the left direction by clicking a left portion of the direction indicator 88.

A tactile stimulation pattern extracted in the user interface 80*b* of FIGS. 13 and 14 may be a multidirectional tactile stimulation pattern.

Figure 15:
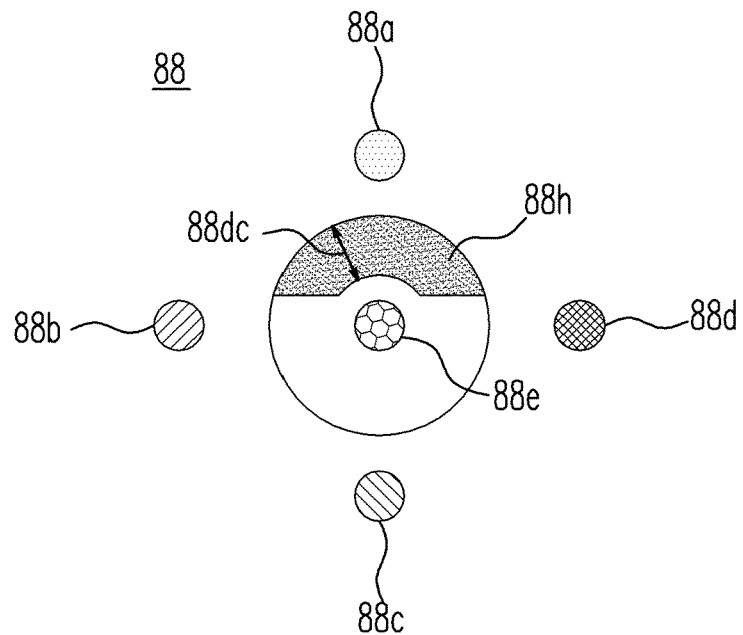
FIG. 15 is a view illustrating another state of the direction indicator.

FIG. 15 is a view illustrating another state of the direction indicator.

Referring to FIG. 15, the highlight part 88*h* of the direction indicator 88 indicates the front direction, but a thickness 88*dc* of the highlight part 88*h* is thicker than that in the case of FIG. 13.

A track and a tactile stimulation frame, which are displayed in the timeline area, may correspond to a middle direction between the front direction and the upper direction. That is, referring to the embodiment of FIG. 15, the state of the direction indicator 88 is adjusted, so that tracks and tactile stimulation frames with respect to infinite directions without number limitation can be edited.

For example, the user may adjust the thickness 88*dc* by dragging an outer edge of the highlight part 88*h*, and the angle of a middle direction with respect to the front direction or the upper direction may be adjusted according to the adjusted thickness 88*dc*.

Figure 16:
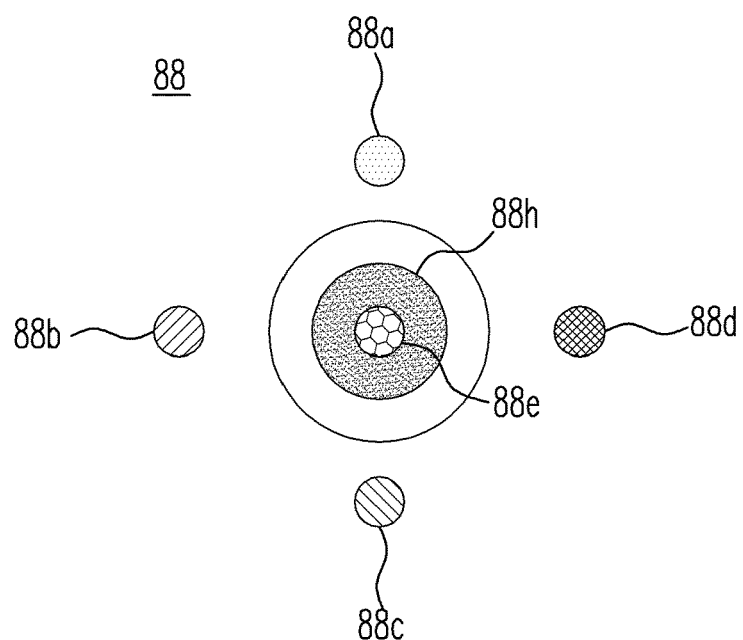
FIG. 16 is a view illustrating still another state of the direction indicator.

FIG. 16 is a view illustrating still another state of the direction indicator.

Referring to FIG. 16, the highlight part 88*h* of the direction indicator 88 indicates the upper direction. A track and a tactile stimulation frame, which are displayed in the timeline area, may correspond to the upper direction.

Figure 17:
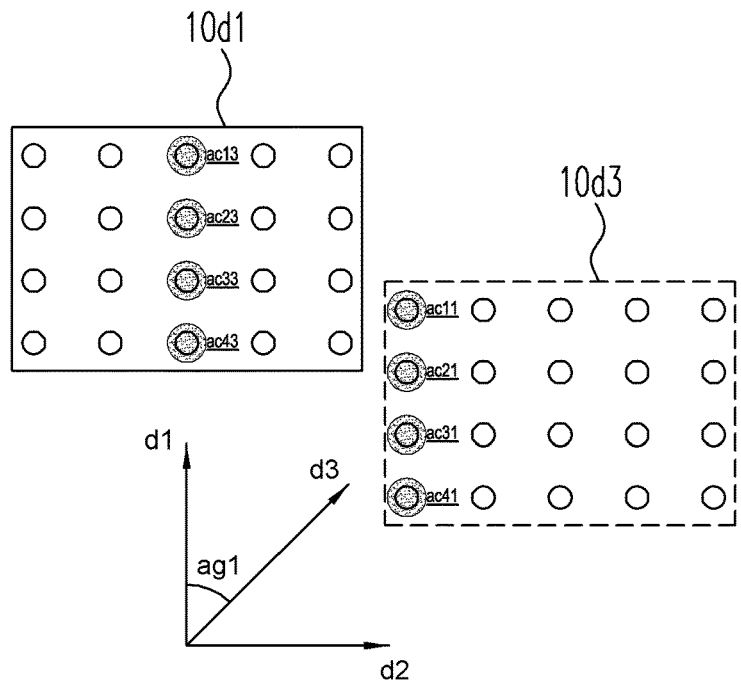
FIG. 17 is a view illustrating tactile stimulation providing apparatuses driven using a method of an embodiment according to a multidirectional tactile stimulation pattern.

FIG. 17 is a view illustrating tactile stimulation providing apparatuses driven using a method of an embodiment according to a multidirectional tactile stimulation pattern.

Each of the tactile stimulation providing apparatuses 10*d*1 and 10*d*3 may include a wearing part, a plurality of actuators located at the wearing part, and a controller for controlling driving of the plurality of actuators according to a multidirectional tactile stimulation pattern including a first direction tactile stimulation pattern and a second direction tactile stimulation pattern. When the tactile stimulation providing apparatus faces a first direction d1, the controller may control driving of a plurality of actuators ac13, ac23, ac33, and ac43 according to the first direction tactile stimulation pattern. When the tactile stimulation providing apparatus faces a second direction d2, the controller may control driving of a plurality of actuators according to the second direction tactile stimulation pattern.

The shape of each of the tactile stimulation providing apparatuses 10*d*1 and 10*d*3 will be described later with reference to drawings from FIG. 20.

In FIG. 17, the tactile stimulation providing apparatus 10*d*1 and the tactile stimulation providing apparatus 10*d*3 are apparatuses identical to each other. The tactile stimulation providing apparatus 10*d*1 means an apparatus facing the first direction d1, and the tactile stimulation providing apparatus 10*d*3 means an apparatus facing a third direction d3.

The multidirectional tactile stimulation pattern may not include tactile stimulation patterns with respect to all directions. For example, the multidirectional tactile stimulation pattern includes the first direction tactile stimulation pattern with respect to the first direction d1 and the second direction tactile stimulation pattern with respect to the second direction d2, but may not include a third direction tactile stimulation pattern with respect to the third direction d3.

When the tactile stimulation providing apparatus 10d3 faces the third direction d3, the controller may drive a plurality of actuators by generating an appropriate tactile stimulation pattern.

In the embodiment of FIG. 17, when the tactile stimulation providing apparatus 103d faces a third direction d3 that does not belong to the multidirectional tactile stimulation pattern and is a direction between the first direction d1 and the second direction d2, the controller may control driving of a plurality of actuators by spacing the first direction tactile stimulation pattern apart.

For example, when the plurality of actuators ac13, ac23, ac33, and ac43 are to be driven in the first direction tactile stimulation pattern, the controller may drive a plurality of actuators ac11, ac21, ac31, and ac41 in the third direction d3.

The controller may control driving a plurality of actuators by spacing the first direction tactile stimulation pattern apart at a distance in proportion to an angle ag1 between the first direction d1 and the third direction d3.

For example, when the angle ag1 increases, the distance at which the pattern is spaced apart may increase. When the angle ag1 decreases, the distance at which the pattern is spaced apart may decrease.

Figure 18:
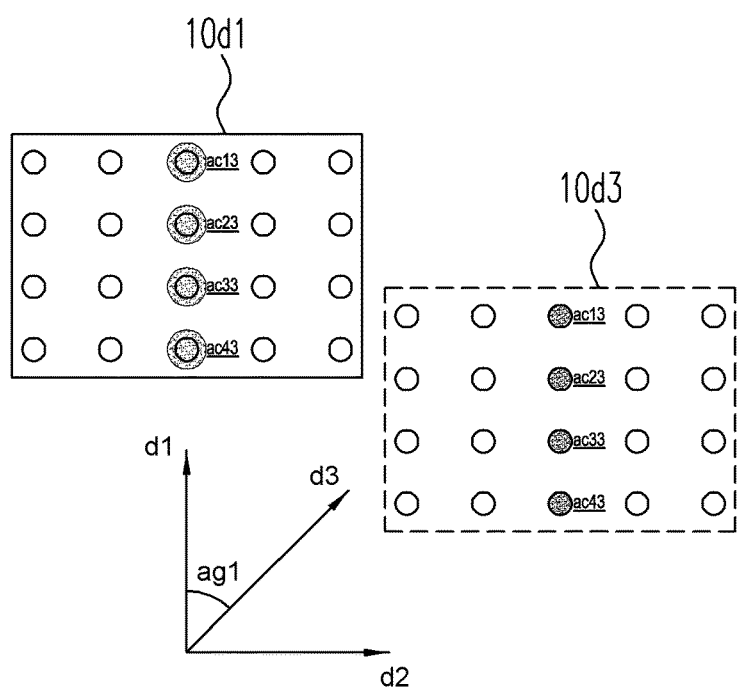
FIG. 18 is a view illustrating the tactile stimulation providing apparatuses driven using a method of another embodiment according to the multidirectional tactile stimulation pattern.

FIG. 18 is a view illustrating the tactile stimulation providing apparatuses driven using a method of another embodiment according to the multidirectional tactile stimulation pattern.

In the embodiment of FIG. 18, when the tactile stimulation providing apparatus 10d3 faces the third direction that does not belong to the multidirectional tactile stimulation pattern, the controller may control driving of a plurality of actuators by lowering the driving strength of the first direction tactile stimulation pattern.

For example, when the plurality of actuators ac13, ac23, ac33, and ac43 are to be driven with a driving strength of 10 in the first direction tactile stimulation pattern, the controller may drive the plurality of actuators ac13, ac23, ac33, and ac43 with a driving strength of 5 in the third direction d3.

The controller may control a plurality of actuators by lowering the driving strength of the first direction tactile stimulation pattern to a magnitude in proportion to the angle ag1 between the first direction d1 and the third direction d3.

For example, when the angle ag1 increases, the driving strength of the plurality of actuators ac13, ac23, ac33, and ac43 may decrease in the third direction d3. When the angle ag1 decreases, the driving strength of the plurality of actuators ac13, ac23, ac33, and ac43 may increase in the third direction d3.

In the embodiments of FIGS. 17 and 18, a case where the position of vibration is changed depending on a direction and a case where the strength of vibration is change depending on a direction are independently described. However, in another embodiment, the position of vibration and the strength of vibration may be simultaneously changed depending on a direction.

In the embodiments of FIGS. 17 and 18, only the first direction tactile stimulation pattern is referred so as to generate a tactile stimulation pattern with respect to the third direction d3. However, in another embodiment, the second direction tactile stimulation pattern may also be referred. For example, a tactile stimulation pattern with respect to the third direction d3 may be generated by allowing a tactile stimulation pattern obtained by applying the above-described algorithm to the first direction tactile stimulation pattern and a tactile stimulation pattern obtained by applying the above-described algorithm to the second direction tactile stimulation pattern to overlap with each other. In still another embodiment, a median value (e.g., a middle position, a middle strength, etc.) of the first direction tactile stimulation pattern and the second direction tactile stimulation pattern, which is derived using an interpolation technique, etc., may be used to generate a third tactile stimulation pattern. In still another embodiment, tactile stimulation patterns in three or more directions may be used for the third direction tactile stimulation pattern.

Figure 19:
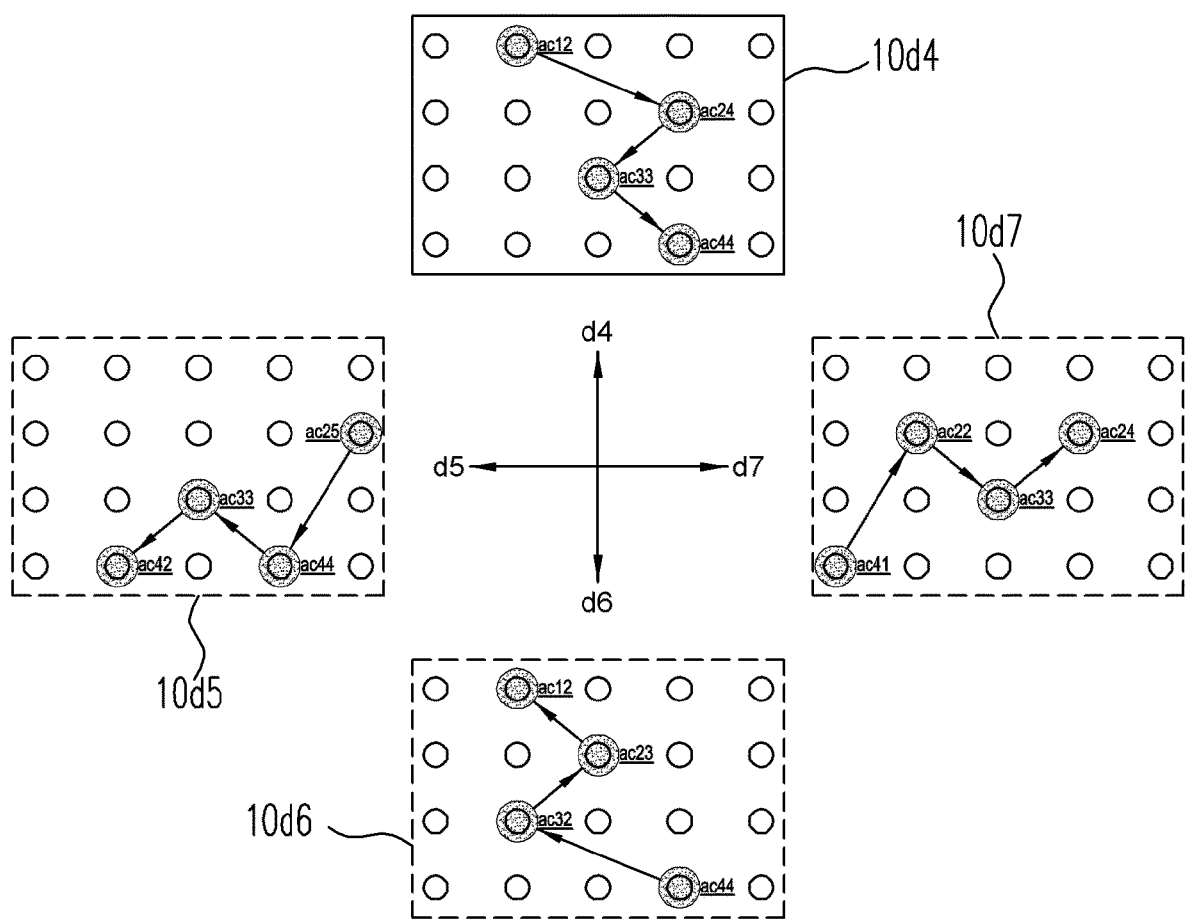
FIG. 19 is a view illustrating tactile stimulation providing apparatuses driven using a method of still another embodiment according to the multidirectional tactile stimulation pattern.

FIG. 19 is a view illustrating tactile stimulation providing apparatuses driven using a method of still another embodiment according to the multidirectional tactile stimulation pattern.

When the tactile stimulation providing apparatus faces other directions d5, d6, and d7 that do not belong to the multidirectional tactile stimulation pattern, the controller may control a plurality of actuators by rotating a tactile stimulation pattern with respect to one direction d4, which belongs to the multidirectional tactile stimulation pattern. The controller may rotate the tactile stimulation pattern with respect to the one direction d4 to an angle in proportion to an angle between the one direction d4 and the other directions d5, d6, and d7.

In the embodiment of FIG. 19, the controller of a tactile stimulation providing apparatus 10d4 is provided with the multidirectional tactile stimulation pattern including a tactile stimulation pattern with respect to a fourth direction d4. For example, a fourth direction tactile stimulation pattern includes a path effect that allows actuators ac12, ac24, ac33, and ac44 to be sequentially vibrated. In this embodiment, the multidirectional tactile stimulation pattern does not include tactile stimulation patterns with respect to a fifth direction d5, a sixth direction d6, and a seventh direction d7.

Hereinafter, a case where the fourth direction d4 is the front direction, the fifth direction d5 is the left direction, the sixth direction d6 is the rear direction, and the seventh direction d7 is the right direction will be assumed and described.

When a tactile stimulation providing apparatus 10d5 faces the left direction d5, the controller may sequentially driver a plurality of actuators ac25, ac44, ac33, and ac42 by rotating a front direction tactile stimulation pattern to the right.

Also, when the tactile stimulation providing apparatus 10d5 faces the right direction d7, the controller may sequentially driver a plurality of actuators ac41, ac22, ac33, and ac24 by rotating the front direction tactile stimulation pattern to the left.

Also, when the tactile stimulation providing apparatus 10d5 faces the rear direction d6, the controller may sequentially driver a plurality of actuators ac44, ac32, ac23, and ac12 by rotating the front direction tactile stimulation pattern by 180 degrees.

The controller may independently operate in the embodiment of FIG. 19. However, in some embodiments, the controller may drive a plurality of actuators by selectively applying the algorithms of FIGS. 17 and 18.

Figure 20:
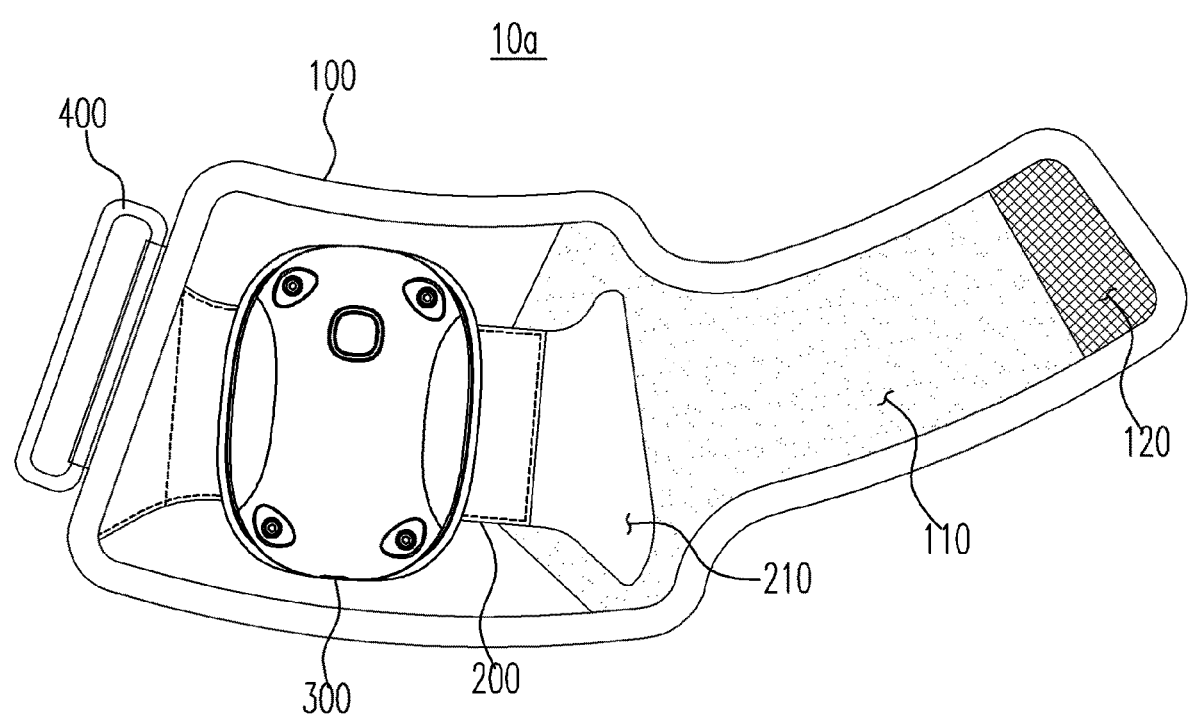
FIG. 20 is a front view of a tactile stimulation providing apparatus according to a first embodiment of the present invention.
Figure 21:
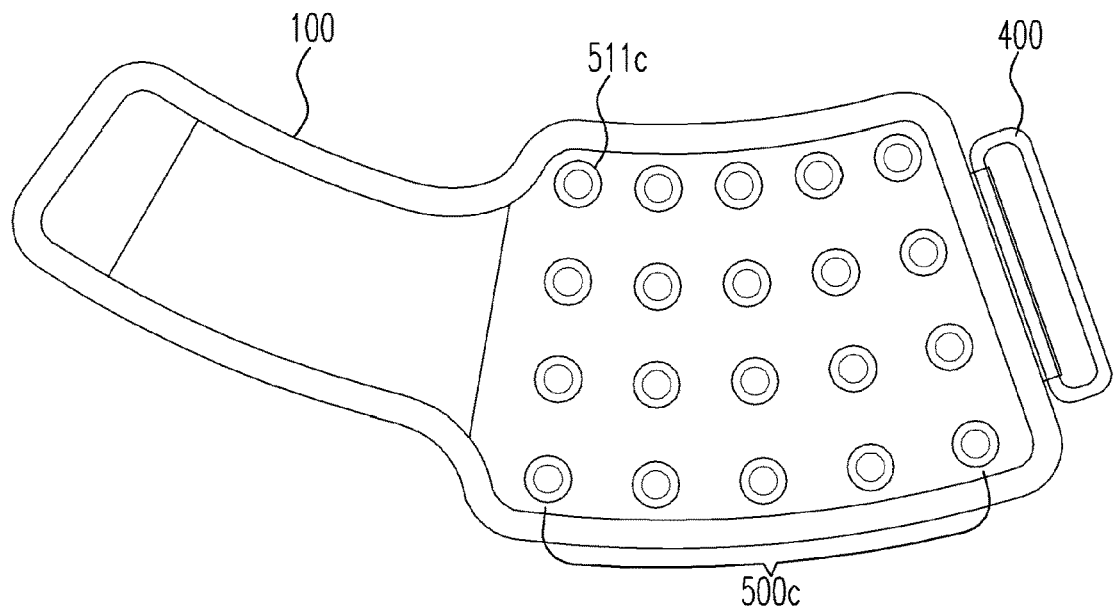
FIG. 21 is a rear view of a tactile stimulation providing apparatus according to the first embodiment of the present invention.

FIG. 20 is a front view of a tactile stimulation providing apparatus according to a first embodiment of the present invention. FIG. 21 is a rear view of a tactile stimulation providing apparatus according to the first embodiment of the present invention.

Referring to FIGS. 20 and 21, the tactile stimulation providing apparatus 10a according to the first embodiment of the present invention includes a plurality of actuators, a base band 100, an auxiliary band 200, and a controller case 300. In some embodiments, the tactile stimulation providing apparatus 10a may further include a ring 400, a plurality of caps 500c, a plurality of bases, a controller, and a signal transmission member.

In the first embodiment, the plurality of bases are located in the base band 100, and the plurality of actuators are located between the base band 100 and the plurality of caps 500c. Therefore, the plurality of bases and the plurality of actuators are not shown in FIGS. 20 and 21. The plurality of bases and the plurality of actuators will be described with reference to FIGS. 27 and 28.

The plurality of actuators are located at the base band 100, and a first detachable member 110 is disposed on an upper surface of one end of the base band 100.

The base band 100 may be made of a flexible member such as a fabric material, a mesh material, a rubber material or a neoprene material. The base band 100 may be configured with a single layer. In a preferable embodiment, the base band 100 may be configured with a plurality of layers. The plurality of layers may be configured with different materials. For example, a lower surface of the base band 100 may be configured with a layer made of a mesh material, and an upper surface of the base band 100 may be formed with a layer made of a neoprene material. The plurality of actuators may be located on the lower surface of the base band 100, which is made of the mesh material. The mesh material may allow vibrations of the plurality of actuators not to be spread, and allow movements of the plurality of actuators not to interfere with each other. In addition, the upper surface of the base band 100, which is made of the neoprene material, is in contact with the controller case 300. The neoprene material may prevent vibrations generated from the plurality of actuators from reaching the controller case 300.

The first detachable member 110 may be a detachable member of type A.

In this embodiment, a detachable member may be of any one of type A and type B. Detachable members of type A and type B can be attached to each other. However, detachable members of type A and type A cannot be attached to each other. All detachable members having these types may be used as detachable members of this embodiment. The detachable member may include, for example, a Velcro, a magnet, an electromagnet, a snap button, etc. In the drawing of this embodiment, a case where the detachable member is a Velcro is assumed and illustrated.

The base band 100 may further include a third detachable member 120 located between the first detachable member 110 and an edge of the one end thereof, the third detachable member 120 being attachable/detachable to/from the first detachable member 110. The third detachable member 120 may be a detachable member of type B. The first detachable member 110 and the third detachable member 120 may be located on the same surface of the base band 100.

Upper and lower edges of the base band 100 may have a streamlined shape. The unfolded shape of the base band 100 is a streamlined shape such as a planar figure of a truncated cone, so that the base band 100 can be adhered more closely to a body of a user when the base band 100 is rolled.

The auxiliary band 200 includes a second attachable member attachable/detachable to/from the first detachable member 110 at a lower surface of one end thereof, and the other end of the auxiliary band 200 is connected to the other end of the base band 100. The second detachable member may be a detachable member of type B.

The auxiliary band 200 separates the controller case 300 from the base band 100, so that noise can be prevented by allowing vibrations of the plurality of actuators located at the base band 100 not to be transferred to the controller case 300. Also, the auxiliary band 200 adjusts a relative attachment position of the second detachable member and the first detachable member 110, so that the position of the controller case 300 can be adjusted to suitable for the body type of the user.

The auxiliary band 200 may further include a fourth detachable member 210 attachable/detachable to/from the third detachable member 120 at an upper surface of the one end thereof. The fourth detachable member 210 may be a detachable member of type A. Thus, the user wears the tactile stimulation providing apparatus 10a, the third detachable member 120 can be attachable/detachable to/from not only the first detachable member 110 but also the fourth detachable member 210. Accordingly, the tactile stimulation providing apparatus 10a of this embodiment can be suitable for various body types of users.

In an embodiment, the one end of the auxiliary band, at which the fourth detachable member is located, may extend like a trumpet shape or a hook shape, so that the controller case 300 is not easily separated.

The ring 400 may be located at the other end of the base band 100. The shape of the ring 400 may correspond to that of the one end of the base band 100. When the user wears the tactile stimulation providing apparatus 10a, the one end of the base band 100 at which the third detachable member is located passes through an opening of the ring 400, and therefore, the shape of the ring 400 may preferably correspond to that of the one end of the base band 100.

The base band 100 may include a plurality of caps 500c at the lower surface thereof. The plurality of caps 500c allow the plurality of actuators to be located at the lower surface of the base band 100 by accommodating the plurality of actuators therein, and may be exposed to the outside. The plurality of caps 500c exposed to the outside may be adhered closely to a body part of the user. Driving power of the actuators corresponding to the plurality of caps 500c is transferred to the body of the user, so that the user can feel a tactile stimulation.

The plurality of bases may allow the plurality of caps 500c to be fixed to the base band 100 at the opposite side of the plurality of caps 500c. In this embodiment, the base band 100 has a plurality of layers, and hence the plurality of bases are not viewed at the point of view of FIGS. 20 and 21.

The controller is located in the controller case 300, and may generate a driving signal corresponding to the plurality of actuators. The controller may include a microcontroller, a motor driver, a power management module, and the like. A separate battery for driving the controller may be located in the controller case 300. The controller may be configured in the form of a printed circuit board (PCB), a flexible printed circuit board (FPCB), an integrated circuit (IC), etc. Also, the controller may receive a tactile stimulation pattern input through the existing wireless communication techniques such as Bluetooth and Wi-Fi or through wired communication techniques. The tactile stimulation pattern may be a multidirectional tactile stimulation pattern. A separate memory device may be located in the controller case 300.

The signal transmission member may transmit a driving signal from the controller to the plurality of actuators. The signal transmission member may be may be configured with an FPCB or a material such as wire. The signal transmission member may electrically connect the plurality of actuators and the controller. The base band 100 may include a second opening, the auxiliary band 200 may include a third opening, and the controller case 300 may include a fourth opening, so as for the signal transmission member to pass therethrough.

Figure 22:
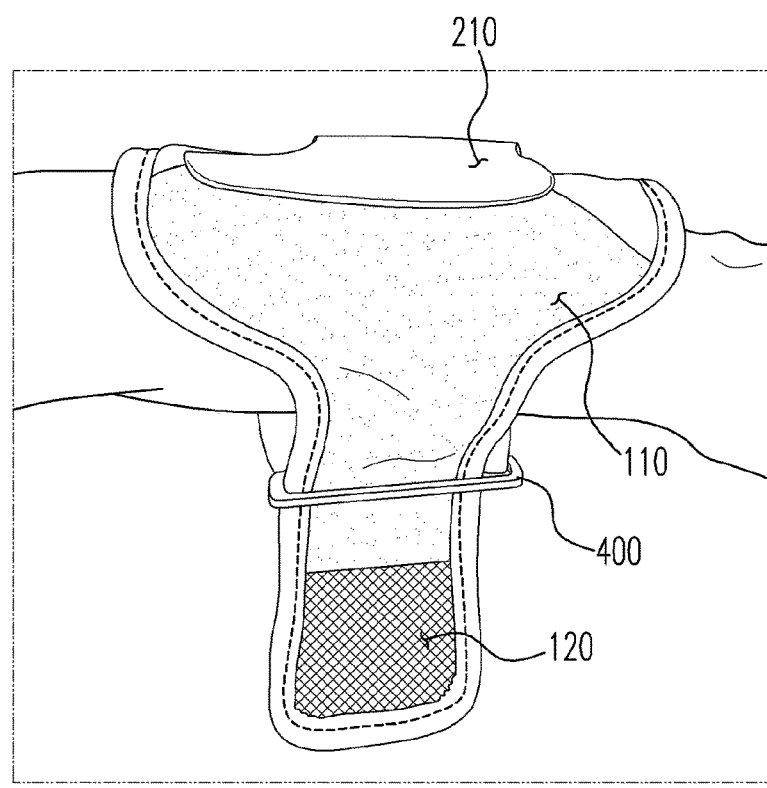
FIG. 22 is a view illustrating a point of time when a user is wearing the tactile stimulation providing apparatus according to the first embodiment of the present invention.

FIG. 22 is a view illustrating a point of time when a user is wearing the tactile stimulation providing apparatus according to the first embodiment of the present invention.

Referring to FIG. 22, the user is wearing the tactile stimulation providing apparatus 10a on a body thereof. In FIG. 22, the tactile stimulation providing apparatus 10a is put on the body of the user, and the one end of the tactile stimulation providing apparatus 10a including the third detachable member 120 passes through the ring 400.

Figure 23:
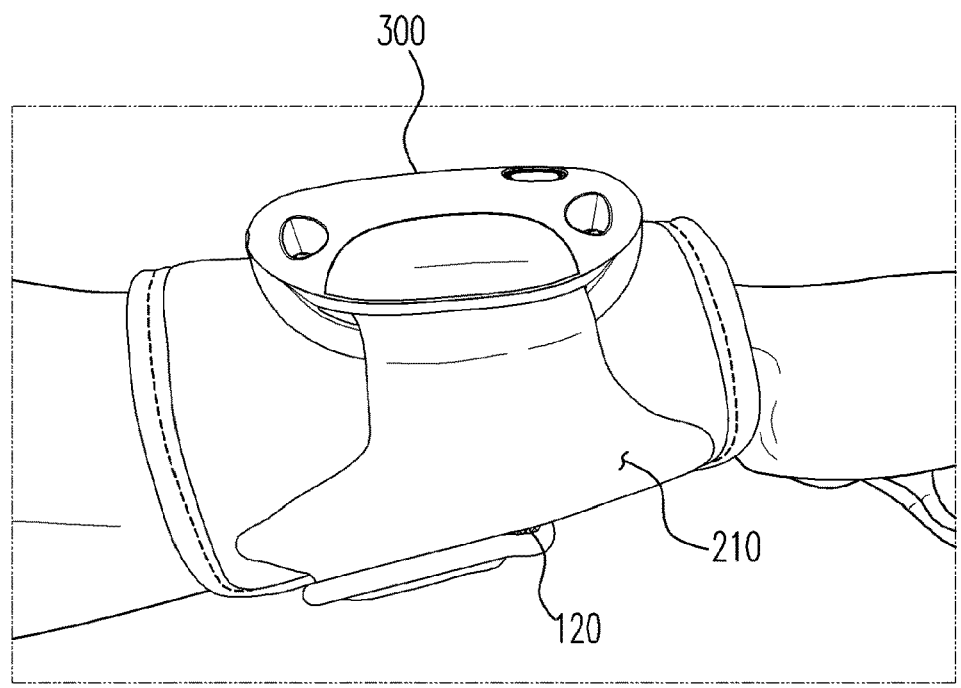
FIG. 23 is a view illustrating a point of time when the user has worn the tactile stimulation providing apparatus according to the first embodiment of the present invention.

FIG. 23 is a view illustrating a point of time when the user has worn the tactile stimulation providing apparatus according to the first embodiment of the present invention.

Referring to FIG. 23, the user attaches the third detachable member 120 of the tactile stimulation providing apparatus 10a to the fourth detachable member 210, so that the tactile stimulation providing apparatus 10a is fixed to a body part of the user. When the thickness of the body part of the user is relatively thick, the third detachable member 120 may be attached to the first detachable member 110. Thus, the third detachable member 120 is attachable to the first detachable member 110 or the fourth detachable member 210, to be available for various bodies of users.

Figure 24:
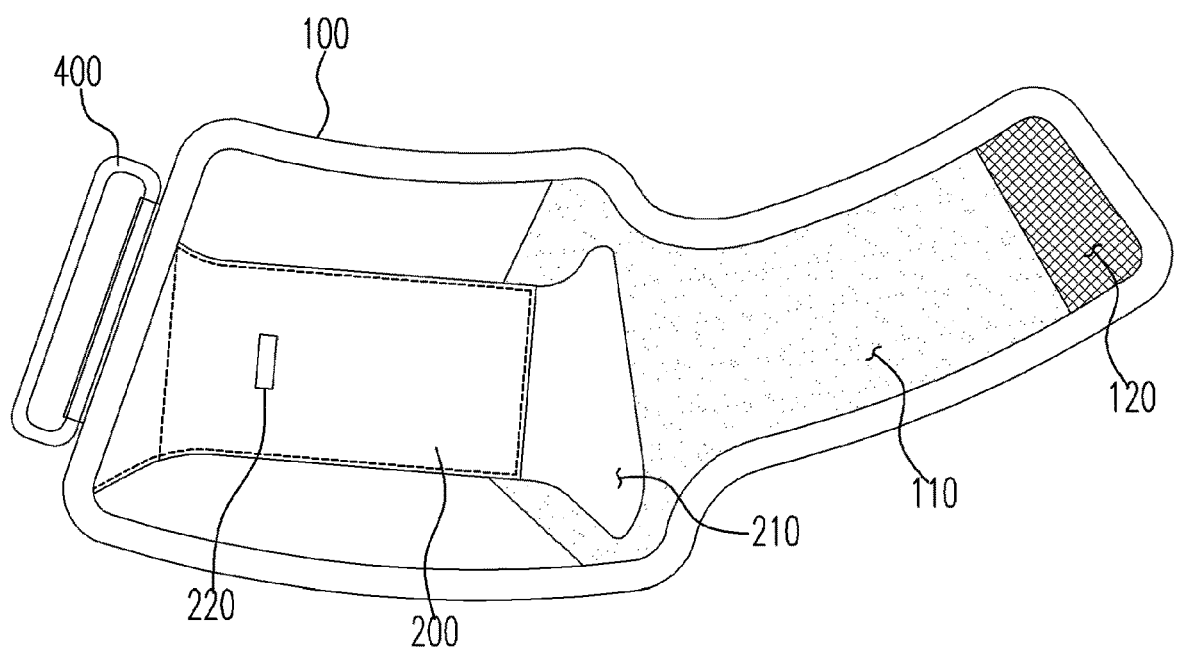
FIG. 24 is a view illustrating a base band and an auxiliary band of the tactile stimulation providing apparatus according to the first embodiment of the present invention.

FIG. 24 is a view illustrating the base band and the auxiliary band of the tactile stimulation providing apparatus according to the first embodiment of the present invention.

FIG. 24 illustrates a state in which the controller case 300 is removed as compared with FIG. 20.

The auxiliary band 200 may include a third opening 220 into which the signal transmission member is inserted.

Although not shown in FIG. 24 due to the auxiliary band 200, the base band 100 may include a second opening into which the signal transmission member is inserted. The third opening and the second opening may have approximately similar sizes and positions.

Figure 25:
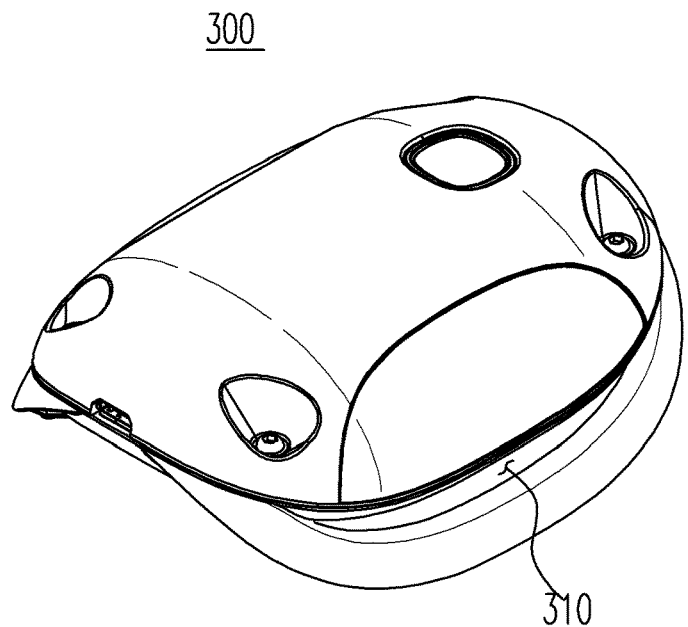
FIG. 25 is a view illustrating a point of view of a controller case of the tactile stimulation providing apparatus according to the first embodiment of the present invention.
Figure 26:
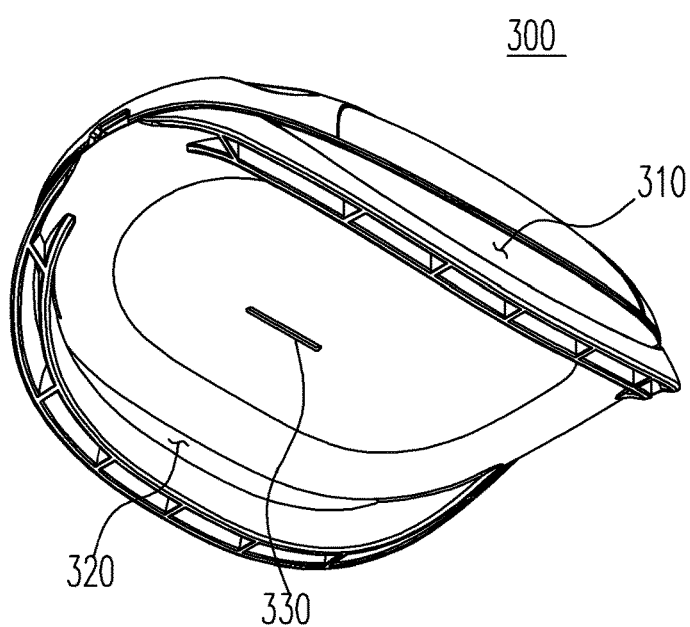
FIG. 26 is a view illustrating another point of view of the controller case of the tactile stimulation providing apparatus according to the first embodiment of the present invention.

FIG. 25 is a view illustrating a point of view of the controller case of the tactile stimulation providing apparatus according to the first embodiment of the present invention. FIG. 26 is a view illustrating another point of view of the controller case of the tactile stimulation providing apparatus according to the first embodiment of the present invention.

Referring to FIGS. 25 and 26, the controller case 300 includes first openings 310 and 320 into which the auxiliary band 200 is inserted. Also, the controller case 300 may further include a fourth opening 330 into which the signal transmission member is inserted.

The controller case 300 may have a lower surface formed concave to be adhered closely to the body of the user. That is, the control case 300 may have a curvature to fit a curve of the body of the user, which is to be designed.

Figure 27:
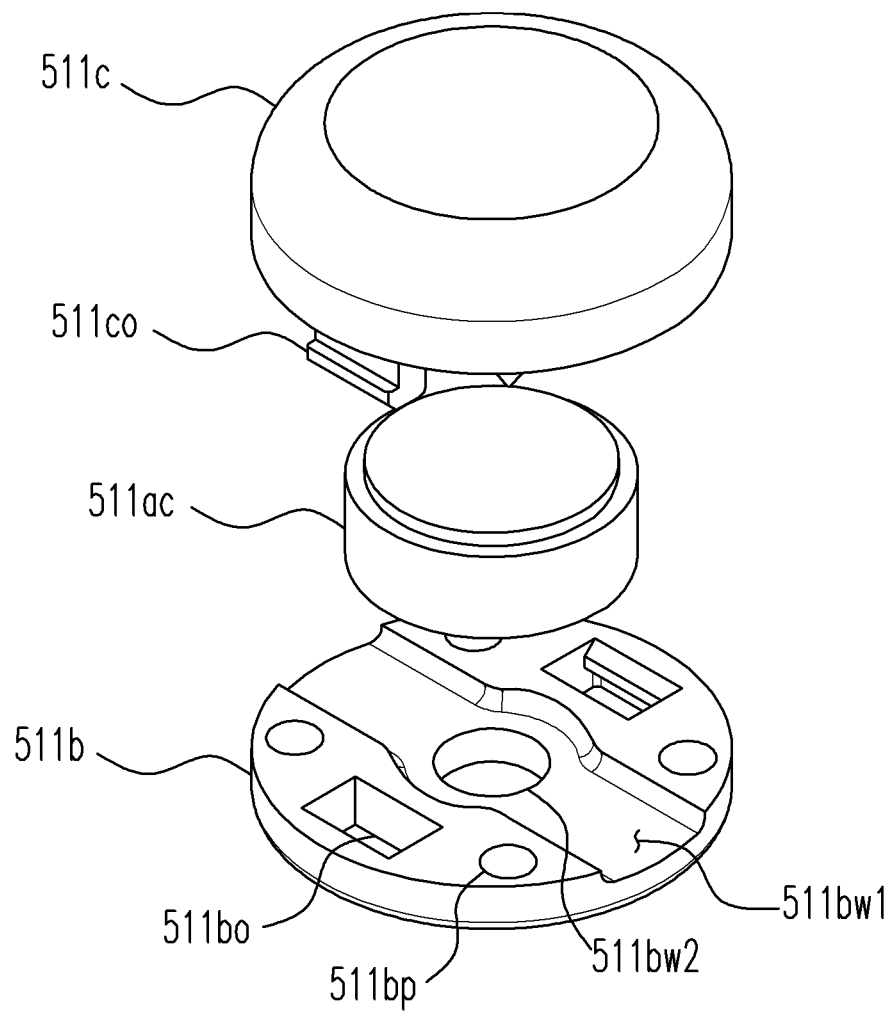
FIG. 27 is a view illustrating a point of view of an actuator case of the tactile stimulation providing apparatus according to the first embodiment of the present invention.
Figure 28:
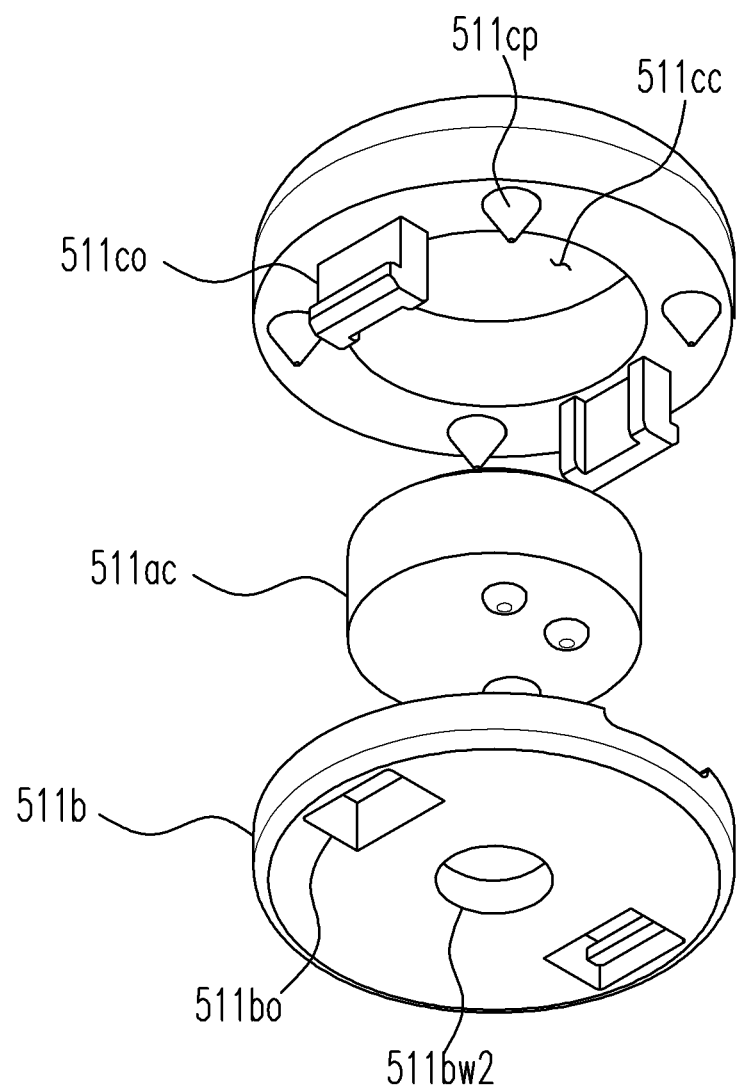
FIG. 28 is a view illustrating another point of view of the actuator case of the tactile stimulation providing apparatus according to the first embodiment of the present invention.

FIG. 27 is a view illustrating a point of view of an actuator case of the tactile stimulation providing apparatus according to the first embodiment of the present invention. FIG. 28 is a view illustrating another point of view of the actuator case of the tactile stimulation providing apparatus according to the first embodiment of the present invention.

Referring to FIGS. 27 and 28, an actuator case corresponding to one actuator 511ac includes a cap 511c and a base 511b. The actuator 511ac may be a coin motor, a shaft type motor, etc.

The cap 511c may include an actuator accommodating part 511cc for accommodating the actuator 511ac. Thus, the actuator 511ac is disposed closer to the cap 511c, so that a vibration of the actuator 511ac can be better transferred to the user.

The cap 511c may include a male fastening part 511co and a projection 511cp, and the base 511b may include a female fastening part 511bo and a recessed part 511bp. The male fastening part 511co may be coupled to the female fastening part 511bo through an opening of the base band 100. The projection 511cp is fitted into the recessed part 511bp by pressing the base band 100, to allow the actuator case to be more stably fixed to the base band 100.

The base 511b may include wire passages 511bw1 and 511bw2. The signal transmission member may electrically connect the actuator 511ac and the controller through the wire passages 511bw1 and 511bw2.

Figure 29:
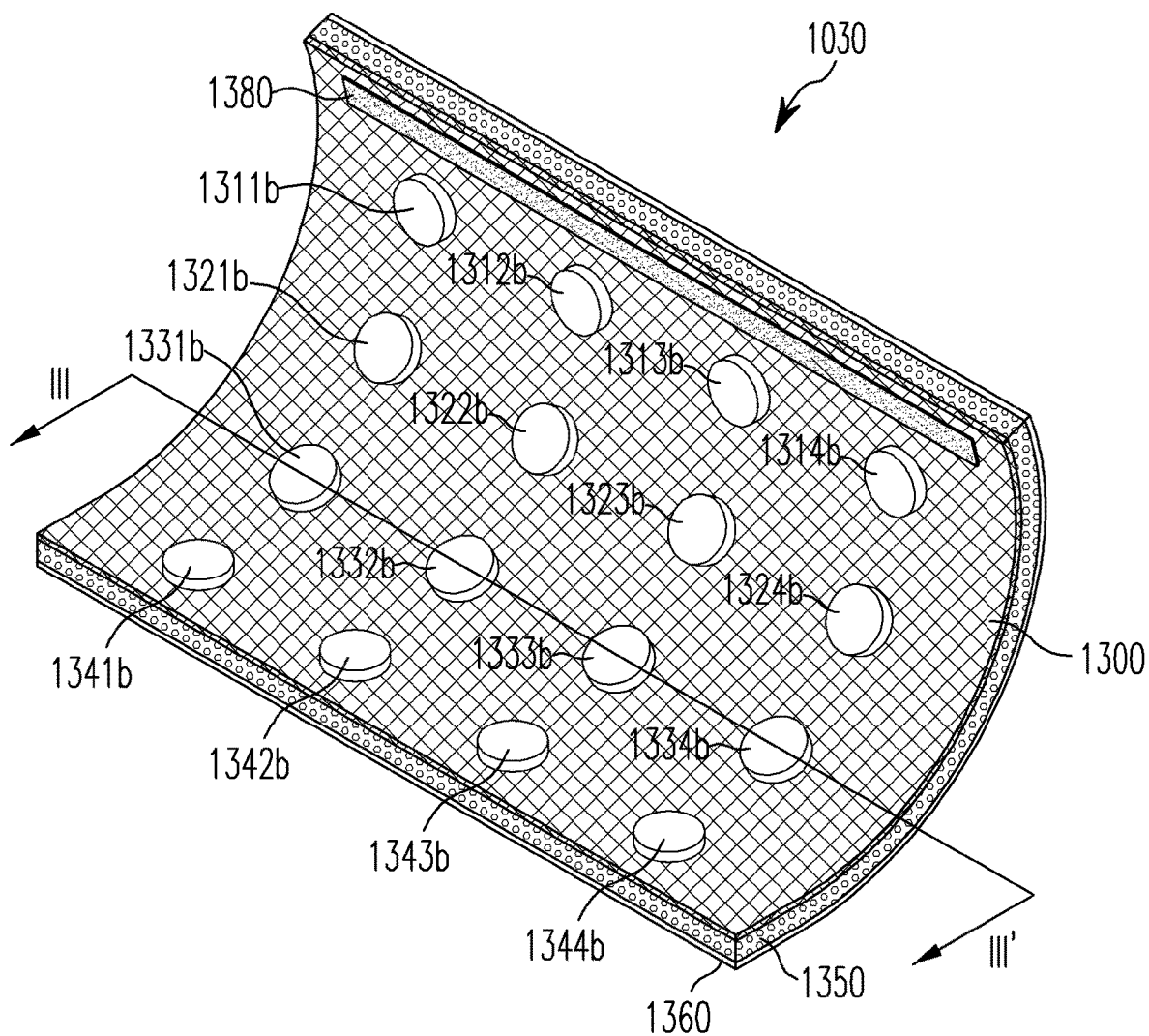
FIG. 29 is a view illustrating a tactile stimulation providing apparatus according to a second embodiment of the present invention.
Figure 30:
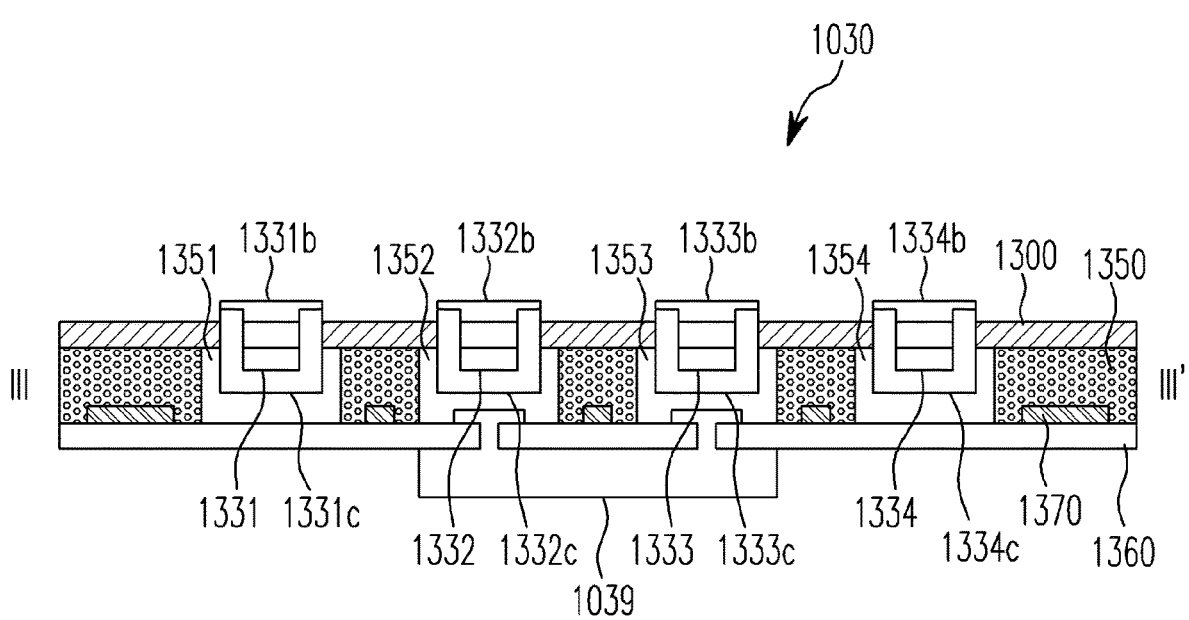
FIG. 30 is a sectional view taken along line III-III' of the tactile stimulation providing apparatus according to the second embodiment of the present invention.

FIG. 29 is a view illustrating a tactile stimulation providing apparatus according to a second embodiment of the present invention. FIG. 30 is a sectional view taken along line III-III' of the tactile stimulation providing apparatus according to the second embodiment of the present invention.

Referring to FIGS. 29 and 30, the tactile stimulation providing apparatus 1030 according to the second embodiment of the present invention includes a base band 1300, a plurality of actuators 1331, 1332, 1333, and 1334, a plurality of actuator cases, a supporting member 1350, and an outer band 1360.

The base band 1300 has flexibility. The base band 1300 may be made of mesh material such as a stocking or a net. The base band 1300 made of the mesh material can ensure free vibrations of the plurality of actuators attached thereto.

The outer band 1360 may be made of a synthetic rubber material such as neoprene. When the outer band 1360 is made of a material such as neoprene, the outer band 1360 can prevent a defect of electronic components including the plurality of actuators, a tear of the base band 1300, which may result in relatively weak durability, and the like. Also, the outer band 1360 can provide satisfaction to a user in terms of aesthetic impression.

A detachable member 1380 may be variously configured with a Velcro, a zipper, a ring, a button, etc.

The tactile stimulation providing apparatus 1030 of the second embodiment includes a plurality of actuator cases. Each actuator case includes a cap covering a corresponding actuator at one surface of the base band 1300 and a base connected to the cap at the other surface of the base band 1300. Thus, the actuator is not directly exposed to the outside, and accordingly, aesthetic impression and durability can be improved. Referring to FIG. 29, a plurality of bases 1311b, 1312b, 1313b, 1314b, 1321b, 1322b, 1323b, 1324b, 1331b, 1332b, 1333b, 1334b, 1341b, 1342b, 1343b, and 1344b of the plurality of actuator cases are located at the other surface of the base band 1300. Referring to FIG. 30, a plurality of caps 1331c, 1332c, 1333c, and 1334c are located at the one surface of the base band 1300, respectively corresponding to the plurality of bases 1331b, 1332b, 133b, and 1334b. The cap 1331c and the base 1331b constitute one actuator case to allow the actuator 1331 to be fixed to the base band 1300, the cap 1332c and the base 1332b constitute one actuator case to allow the actuator 1332 to be fixed to the base band 1300, the cap 1333c and the base 1333b constitute one actuator case to allow the actuator 1333 to be fixed to the base band 1300, and the cap 1334c and the base 1334b constitute one actuator case to allow the actuator 1334 to be fixed to the base band 1300. The plurality of actuator cases may be made of a solid material such as plastic.

The supporting member 1350 of the second embodiment includes a plurality of openings 1351, 1352, 1353, and 1354 interposed between the base band 1300 and the outer band 1360, the plurality of openings 1351, 1352, 1353, and 1354 corresponding to the respective caps 1331c, 1332c, 1333c, and 1334c of the plurality of actuator cases. The supporting member 1350 may be made of a material such as a sponge.

Sizes of the plurality of openings 1351, 1352, 1353, and 1354 may be larger than those of the corresponding caps 1331c, 1332c, 1333c, and 1334c, respectively. Thus, there can be prevented a case where the supporting member 1350 interferes with the actuators 1331, 1332, 1333, and 1334 by attenuating vibration outputs of the actuators 1331, 1332, 1333, and 1334.

The user may feel an output of each of the actuators through the bases 1311b, 1312b, 1313b, 1314b, 1321b, 1322b, 1323b, 1324b, 1331b, 1332b, 1333b, 1334b, 1341b, 1342b, 1343b, and 1344b, which are adhered closely to a body of the user. In the tactile stimulation providing apparatus 1030 of the second embodiment, although the plurality of actuators are densely arranged, the user can easily distinguish outputs from one another.

A signal transmission member 1370 may be interposed between the supporting member 1350 and the outer band 1360. The signal transmission member 1370 may be configured with an electric wire, an FPCB, etc., and transmit a driving control signal of a controller to the plurality of actuators. The controller may be located in a controller case 1039. The controller case 1039 may be connected to the outer band 1360.

Figure 31:
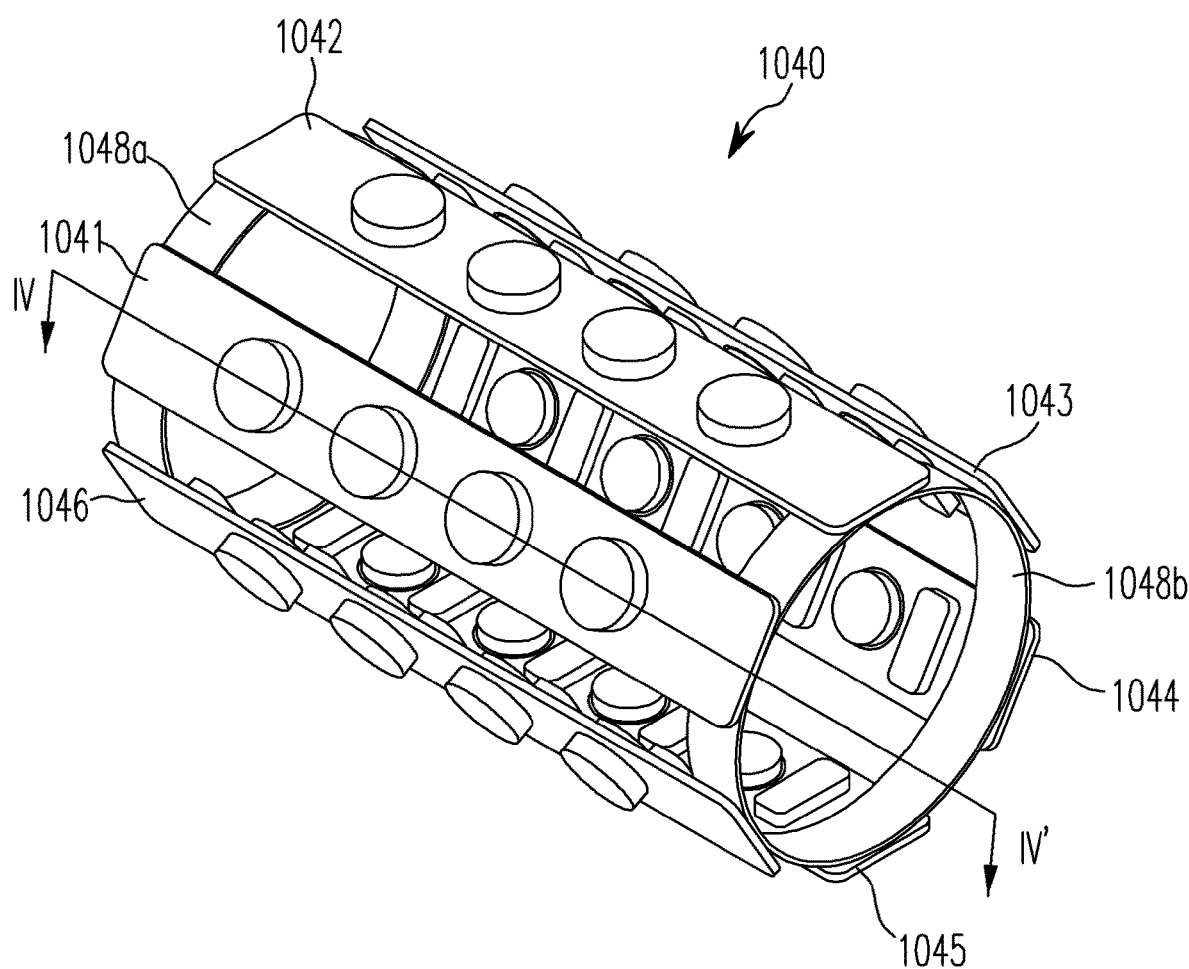
FIG. 31 is a view illustrating a tactile stimulation providing apparatus according to a third embodiment of the present invention.
Figure 32:
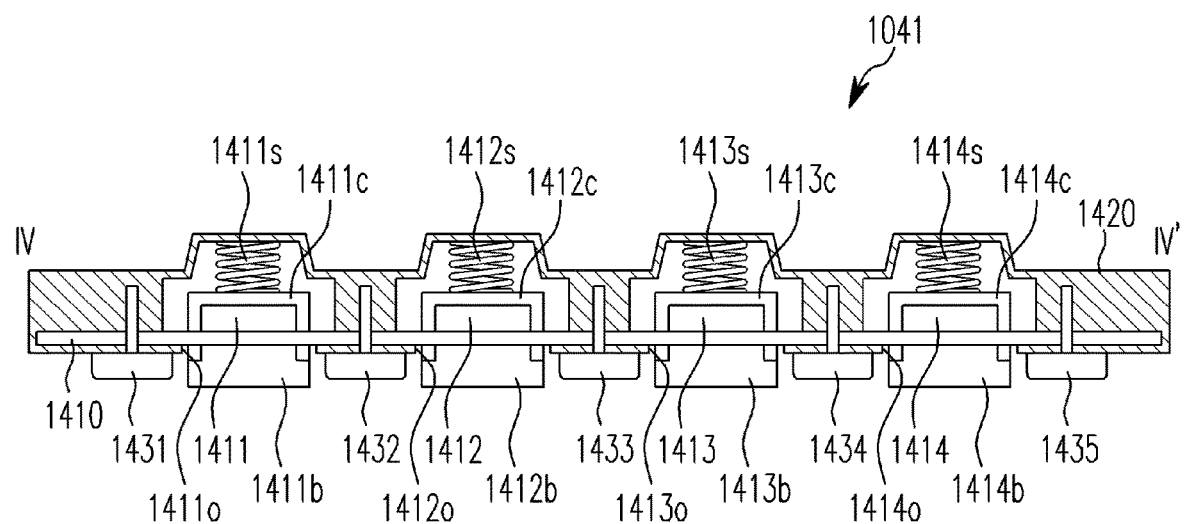
FIG. 32 is a sectional view taken along line IV-IV' of the tactile stimulation providing apparatus according to the third embodiment of the present invention.

FIG. 31 is a view illustrating a tactile stimulation providing apparatus according to a third embodiment of the present invention. FIG. 32 is a sectional view taken along line IV-IV' of the tactile stimulation providing apparatus according to the third embodiment of the present invention.

Referring to FIG. 31, the tactile stimulation providing apparatus 1040 according to the third embodiment of the present invention includes a plurality of actuator modules 1041, 1042, 1043, 1044, 1045, and 1046. The plurality of actuator modules 1041, 1042, 1043, 1044, 1045, and 1046 may be connected to one another by a cylindrical first connection band 1048a and a cylindrical second connection band 1048b. A user may wear the tactile stimulation providing apparatus 1040 by inserting a body such as a wrist into the first connection band 1048a and the second connection band 1048b. The first and second connection bands 1048a and 1048b may allow the plurality of actuator modules 1041, 1042, 1043, 1044, 1045, and 1046 to be adhered closely to the body of the user, using their elasticity. The first and second connection bands 1048a and 1048b may be replaced with various detachable members such as a Velcro, a zipper, a ring, and a button.

Referring to FIG. 32, the actuator module 1041 of the third embodiment includes a module case 1420, a base band 1410, a plurality of actuators 1411, 1412, 1413, and 1414, a plurality of elastic members 1411s, 1412s, 1413s, and 1414s, and a plurality of actuator cases.

A cap 1411c and a base 1411b constitute one actuator case to allow the actuator 1411 to be fixed to the base band 1410, a cap 1412c and a base 1412b constitute one actuator case to allow the actuator 1412 to be fixed to the base band 1410, a cap 1413c and a base 1413b constitute one actuator case to allow the actuator 1413 to be fixed to the base band 1410, and a cap 1414c and a base 1414b constitute one actuator case to allow the actuator 1414 to be fixed to the base band 1410.

The base band 1410 may be fixedly connected to the module case 1420, using a connection member such as a screw. The base band 1410 may be made of a flexible material such as a silicon material. The module case 1420 may be made of a solid material such as plastic.

The module case 1420 includes a plurality of openings 1411o, 1412o, 1413o, and 1414o corresponding to the plurality of actuator cases. The base 1411b protrudes to the outside through the opening 1411o, the base 1412b protrudes to the outside through the opening 1412o, the base 1413b protrudes to the outside through the opening 1413o, and the base 1414b protrudes to the outside through the opening 1414o. The openings 1411o, 1412o, 1413o, and 1414o may be configured to have a size where the bases 1411b, 1412b, 1413b, and 1414b and the module case 1420 do not collide with each other even in horizontal vibrations of the actuators 1411, 1412, 1413, and 1414.

When the actuator module 1041 is adhered closely to a body of the user, the user may receive outputs of corresponding actuators 1411, 1412, 1413, and 1414 through the bases 1411b, 1412b, 1413b, and 1414b adhered closely to the body of the user together with the actuator module 1041.

The elastic members 1411s, 1412s, 1413s, and 1414s may be made of a material such as a sponge, and the caps 1411c, 1412c, 1413c, and 1414c may be connected to the module case 1420 with the corresponding elastic members 1411s, 1412s, 1413s, and 1414s interposed therebetween. The elastic members 1411s, 1412s, 1413s, and 1414s allow vibration outputs of the actuators 1411, 1412, 1413, and 1414 to be concentrated on the body of the user by preventing the vibration outputs from being dispersed in the module case 1420. Also, the elastic members 1411s, 1412s, 1413s, and 1414s allow the base 1411b, 1412b, 1413b, and 1414b to be adhered closely to the body of the user regardless of a curve of the body of the user.

The plurality of actuator cases are not connected directly to the module case 1420, but connected to the module case 1420 through the base band 1410 and the elastic members 1411s, 1412s, 1413s, and 1414s. Thus, the module case 1420 can have a sufficient space capable of preparing for vibrations of the actuators 1411, 1412, 1413, and 1414. In addition, the actuators 1411, 1412, 1413, and 1414 can transfer vibrations, etc. to the body of the user through the bases 1411b, 1412b, 1413b, and 1414b without attenuating outputs thereof.

Figure 33:
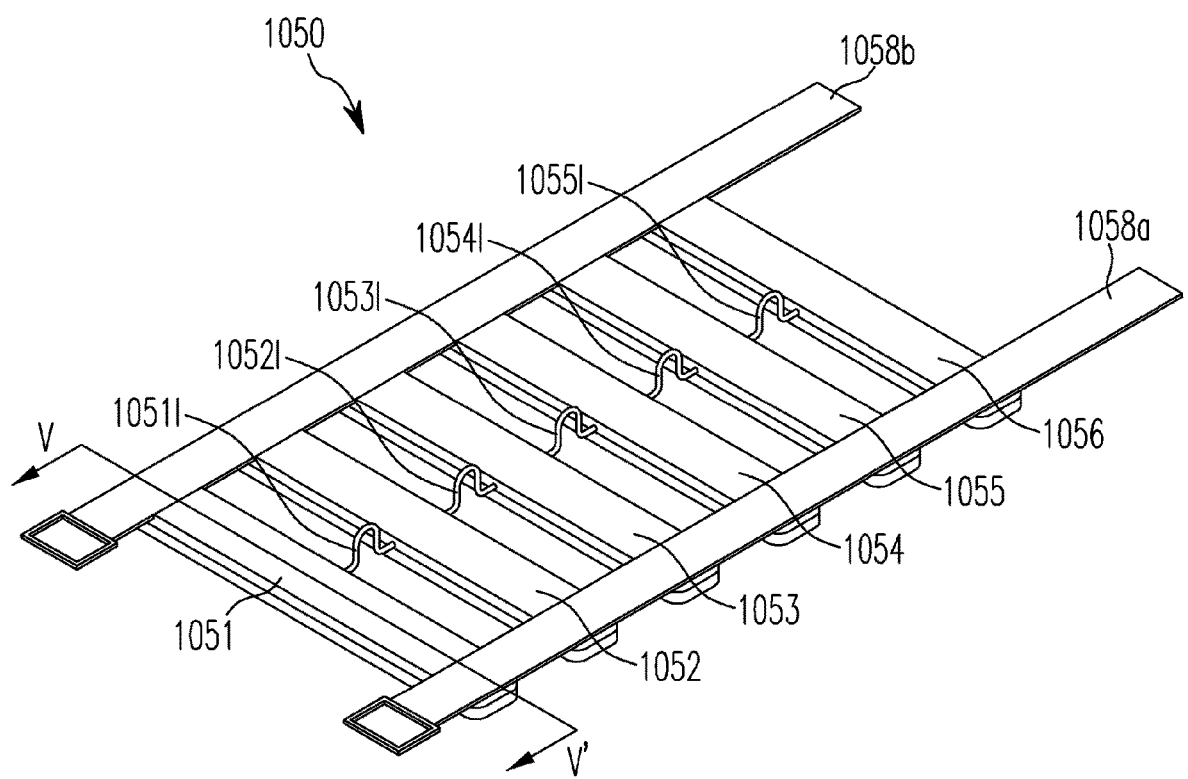
FIG. 33 is a view illustrating a tactile stimulation providing apparatus according to a fourth embodiment of the present invention.
Figure 34:
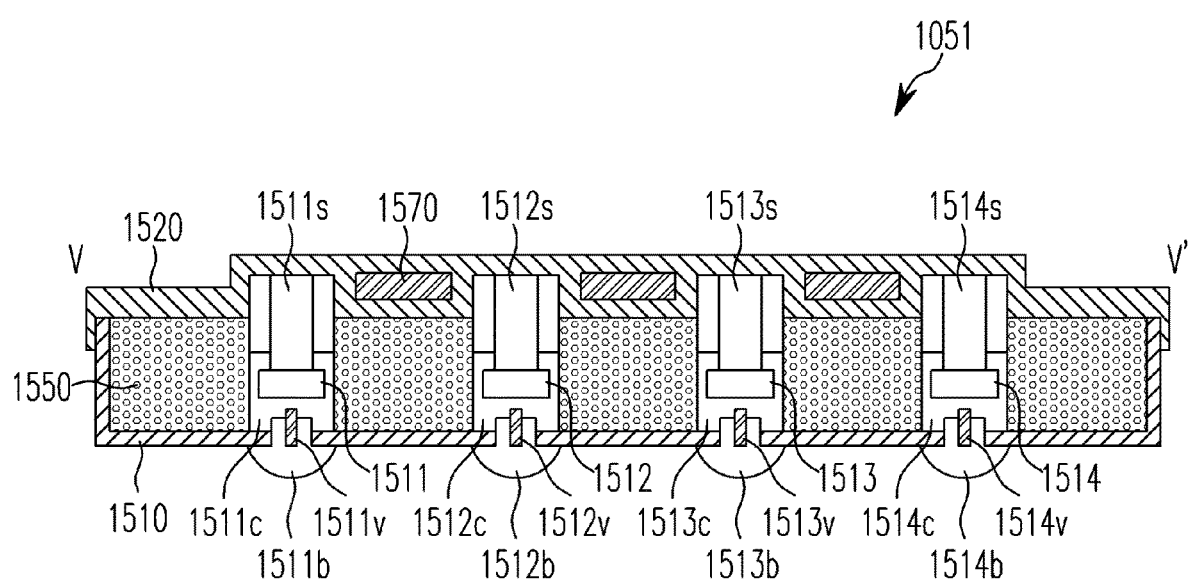
FIG. 34 is a sectional view taken along line V-V' of the tactile stimulation providing apparatus according to the fourth embodiment of the present invention.

FIG. 33 is a view illustrating a tactile stimulation providing apparatus according to a fourth embodiment of the present invention. FIG. 34 is a sectional view taken along line V-V' of the tactile stimulation providing apparatus according to the fourth embodiment of the present invention.

Referring to FIG. 33, the tactile stimulation providing apparatus 1050 according to the fourth embodiment of the present invention includes a plurality of actuator modules 1051, 1052, 1053, 1054, 1055, and 1056. The plurality of actuator modules 1051, 1052, 1053, 1054, 1055, and 1056 may be connected to one another by a first connection band 1058a and a second connection band 1058b. Each of the first and second connection bands 1058a and 1058b may allow the tactile stimulation providing apparatus 1050 to be worn on a body of a user by connecting the other end thereof to a ring structure at one end thereof. Although the elasticity of a material of the first and second connection bands 1058a and 1058b is insufficient, the user connects each of the first and second connection bands 1058a and 1058b by arbitrarily adjusting the length of the band. Thus, the plurality of actuator modules 1051, 1052, 1053, 1054, 1055, and 1056 can be adhered closely to the body of the user. The first and second connection bands 1058a and 1058b may be replaced with various detachable members such as a Velcro, a zipper, a ring, and a button.

Signal transmission members 1051l, 1052l, 1053l, 1054l, and 1055l may be selectively provided when communication between the actuator modules 1051, 1052, 1053, 1054, 1055, and 1056 is required. In FIG. 33, the signal transmission members 1051*l*, 1052*l*, 1053*l*, 1054*l*, and 1055*l* are exposed to the outside. However, the signal transmission members 1051*l*, 1052*l*, 1053*l*, 1054*l*, and 1055*l* may be located in the first or second connection band 1058*a* or 1058*b* not to be viewed by the user.

Referring to FIG. 34, the actuator module 1051 includes a base band 1510, a supporting member 1550, a plurality of elastic members 1511*s*, 1512*s*, 1513*s*, and 1514*s*, a plurality of actuators 1511, 1512, 1513, and 1514, and a plurality of actuator cases.

A cap 1511*c* and a base 1511*b* constitute one actuator case to allow the actuator 1511 to be fixed to the base band 1510, a cap 1512*c* and a base 1512*b* constitute one actuator case to allow the actuator 1512 to be fixed to the base band 1510, a cap 1513*c* and a base 1513*b* constitute one actuator case to allow the actuator 1513 to be fixed to the base band 1510, and a cap 1514*c* and a base 1514*b* constitute one actuator case to allow the actuator 1514 to be fixed to the base band 1510.

In an embodiment, the caps 1511*c*, 1512*c*, 1513*c*, and 1514*c* and the base 1511*b*, 1512*b*, 1513*b*, and 1514*b* may be connected to each other through connection members 1511*v*, 1512*v*, 1513*v*, and 1514*v* such as screws, respectively. When the connection members 1511*v*, 1512*v*, 1513*v*, and 1514*v* are used, distances between the actuators 1511, 1512, 1513, and 1514 and the base 1511*b*, 1512*b*, 1513*b*, and 1514*b* can be increased. Thus, vibrations of the actuators 1511, 1512, 1513, and 1514 can be transferred far away.

The module cover 1520 may be made of a solid material such as plastic. The module cover 1510 is opposite to one surface of the base band 1510, and the supporting member 1550 may be interposed between the module cover 1520 and the base band 1510. The supporting member 1550 may be made of a material such as a sponge. The supporting member 1550 may include a plurality of openings respectively corresponding to the caps 1511*c*, 1512*c*, 1513*c*, and 1514*c* of the plurality of actuator cases.

The base band 1510 of the fourth embodiment may be made of a material identical or similar to those of the base bands of the second and third embodiments. In another embodiment, the base band 1510 may be integrally configured with the supporting member 1550, using the same material.

In an embodiment, the caps 1511*c*, 1512*c*, 1513*c*, and 1514*c* may include openings exposing upper surfaces of corresponding actuators 1511, 1512, 1513, and 1514, respectively. The actuators 1511, 1512, 1513, and 1514 may be connected to the module cover 1520 respectively through the elastic members 1511*s*, 1512*s*, 1513*s*, and 1514*s* interposed in the openings of the caps 1511*c*, 1512*c*, 1513*c*, and 1514*c*. The elastic members 1511*s*, 1512*s*, 1513*s*, and 1514*s* may be made of a material such as a sponge. In another embodiment, the caps 1511*c*, 1512*c*, 1513*c*, and 1514*c* may be directly connected to the respective elastic members 1511*s*, 1512*s*, 1513*s*, and 1514*s* without the openings.

The material constituting the elastic members 1511*s*, 1512*s*, 1513*s*, and 1514*s* may be a material more solid than that constituting the supporting member 1550. When the supporting member 1550 is made of a soft sponge material, the actuator module 1051 can be well adhered closely to the body of the user, corresponding to a curve of the body of the user. However, the elastic members 1511*s*, 1512*s*, 1513*s*, and 1514*s* are also made of a soft sponge material, the plurality of actuator cases are pushed toward the module cover 1520, and therefore, the bases 1511*b*, 1512*b*, 1513*b*, and 1514*b* may not be sufficiently adhered closely to the body of the user. In order to prevent this, the elastic members 1511*s*, 1512*s*, 1513*s*, and 1514*s* may be preferably made of a material such as a sponge or a spring, which is more solid than the supporting member. That is, the elasticity of the material constituting the elastic members 1511*s*, 1512*s*, 1513*s*, and 1514*s* may be preferably more solid than that of the material constituting the supporting member 1550.

A signal transmission member 1570 may be located in the module cover 1520. The signal transmission member 1570 may be configured with a combination of an electric wire, an FPCB, etc., and electrically connect a controller and the plurality actuators 1511, 1512, 1513, and 1514.

Although the present invention has been described with reference to exemplary embodiments illustrated in the drawings for illustrative purposes, those skilled in the art will appreciate that various modifications and equivalent embodiments are possible, without departing from the scope and spirit of the invention. Accordingly, the substantial technical protection scope of the present invention will be defined by the appended claims.

The invention claimed is:

1. A computer-readable recording medium for recording a program executable by a computer,
wherein the program generates a graphical user interface, and the graphical user interface includes:
an arrangement area including a plurality of virtual actuators which are spaced apart from each other and to which a physical arrangement of a plurality of actuators is mapped, with respect to a tactile stimulation frame;
a content area including a reference content having time-series information; and
a timeline area in which the tactile stimulation frame is arranged corresponding to the time-series information,
wherein the tactile stimulation frame is generated by a path drawn in the arrangement area,
wherein the path includes at least one point which is disposed between the plurality of virtual actuators, and
wherein the timeline area includes a track addition feature for adding a plurality of tracks to correspond to a number of a plurality of tactile stimulation providing apparatuses worn by a single user each of the tactile stimulation providing apparatuses comprising the plurality of actuators corresponding to the plurality of virtual actuators corresponding to the path.

2. The computer-readable recording medium of claim 1, wherein the tactile stimulation frame is subordinate to any one track among the plurality of tracks.

3. The computer-readable recording medium of claim 1, wherein the timeline area includes a plurality of tracks corresponding to a plurality of directions, and
wherein the tactile stimulation frame is subordinate to any one track among the plurality of tracks.

4. The computer-readable recording medium of claim 3, wherein the graphical user interface further includes a direction indicator, and
wherein any one direction among the plurality of directions is selected based on a state of the direction indicator, and a track corresponding to the selected direction is displayed in the timeline area.

* * * * *